United States Patent
Sugaya

(10) Patent No.: US 12,323,910 B2
(45) Date of Patent: Jun. 3, 2025

(54) WIRELESS COMMUNICATION TERMINAL AND METHOD

(71) Applicant: SONY GROUP CORPORATION, Tokyo (JP)

(72) Inventor: Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 386 days.

(21) Appl. No.: 17/755,701

(22) PCT Filed: Oct. 30, 2020

(86) PCT No.: PCT/JP2020/040769
§ 371 (c)(1),
(2) Date: May 5, 2022

(87) PCT Pub. No.: WO2021/095559
PCT Pub. Date: May 20, 2021

(65) Prior Publication Data
US 2022/0386227 A1 Dec. 1, 2022

(30) Foreign Application Priority Data
Nov. 14, 2019 (JP) ................................ 2019-206204

(51) Int. Cl.
*H04W 48/18* (2009.01)
*H04W 28/02* (2009.01)
(Continued)

(52) U.S. Cl.
CPC ....... *H04W 48/18* (2013.01); *H04W 28/0236* (2013.01); *H04W 40/22* (2013.01); *H04W 48/16* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2016/0021526 A1* | 1/2016 | Niu | H04L 27/2614 370/230 |
| 2016/0192153 A1* | 6/2016 | Namba | H04W 4/026 455/456.1 |
| 2016/0205184 A1* | 7/2016 | Norlin | H04L 67/1095 709/248 |

FOREIGN PATENT DOCUMENTS

| | | | | |
|---|---|---|---|---|
| CN | 111654842 | * | 1/2014 | ............ H04W 72/02 |
| EP | 3878237 A1 | | 9/2021 | |

(Continued)

OTHER PUBLICATIONS

Nan, et al., "Consideration on Multi-AP Coordination", IEEE, Institute of Electrical and Electronics Engineers, Sep. 6, 2019, 09 pages.

(Continued)

*Primary Examiner* — Chi H Pham
*Assistant Examiner* — Raul Rivas
(74) *Attorney, Agent, or Firm* — CHIP LAW GROUP

(57) ABSTRACT

Provided is a wireless communication terminal and a wireless communication method that make it possible to execute coordinated transmission via a desired access point. The wireless communication terminal starts setting up the coordinated transmission in order to cause a plurality of wireless communication apparatuses to execute the coordinated transmission. The wireless communication terminal is applicable to a wireless communication system.

15 Claims, 27 Drawing Sheets

(51) Int. Cl.
*H04W 40/22* (2009.01)
*H04W 48/16* (2009.01)
*H04W 76/15* (2018.01)

(56) References Cited

FOREIGN PATENT DOCUMENTS

| | | |
|---|---|---|
| EP | 3897047 A1 | 10/2021 |
| JP | 11-003317 A | 1/1999 |
| JP | 2012-217045 A | 11/2012 |

OTHER PUBLICATIONS

Aio, et al., "Consideration on Multi-AP Ack Protocol", IEEE, Institute of Electrical and Electronics Engineers, Sep. 15, 2019, 10 pages.
International Search Report and Written Opinion of PCT Application No. PCT/JP2020/040769, issued on Jan. 26, 2021, 09 pages of ISRWO.

\* cited by examiner

FIG. 6

| Coordinate Request | | | | | | | |
|---|---|---|---|---|---|---|---|
| Frame Control | Duration | Destination Address | Source Address | Receive Address | Transmit Address | Sequence Control | Coordinate Control IE | Application Control IE | FCS |

FIG. 7

| IE Type | Length | Terminal Address | Coordinate AP Address | Coordinate AP Address | Operator Info | Provider Info | Database Address | Application Type | .... |

Coordinate Control IE

FIG. 8

| IE Type | Length | Terminal Address | Database Address | Application Type | Service Type | Contents Directory | Contents Filename | File Type | File Size | ... |
|---|---|---|---|---|---|---|---|---|---|---|

Application Control IE

FIG. 9

| Frame Control | Duration | Destination Address | Source Address | Receive Address | Transmit Address | Sequence Control | Coordinate Control IE | Application Control IE | FCS |

Coordinate Indication

FIG. 10

| Frame Control | Duration | Destination Address | Source Address | Receive Address | Transmit Address | Coordinate Confirmation | | | FCS |
|---|---|---|---|---|---|---|---|---|---|
| | | | | | | Control IE | Coordinate Control IE | Application Control IE | Network Control IE | |

FIG. 11

| IE Type | Length | Support Protocol | Version | Attribute | Throughput | Cost | Speed | Latency | Delay | Congestion |
|---------|--------|------------------|---------|-----------|------------|------|-------|---------|-------|------------|
| | | | | | Network Control IE | | | | | |

FIG. 12

| Frame Control | Duration | Destination Address | Source Address | Receive Address | Transmit Address | Coordinate Control IE | Application Control IE | Network Control IE | FCS |
|---|---|---|---|---|---|---|---|---|---|

Coordinate Response

FIG. 13

| Frame Control | Duration | Destination Address | Source Address | Receive Address | Transmit Address | Sequence Control | QoS Control | Application Control IE | FCS |
|---|---|---|---|---|---|---|---|---|---|

Application Request

FIG. 14

| Frame Control | Duration | Destination Address | Source Address | Receive Address | Transmit Address | Sequence Control | Application Control IE | Network Control | FCS |
|---|---|---|---|---|---|---|---|---|---|

Application Response

FIG. 19

| Frame Control | Duration | Destination Address | Source Address | Receive Address | Transmit Address | Sequence Control | Coordinate Control IE | Application Control IE | FCS |

Route Request

FIG. 20

| Frame Control | Duration | Destination Address | Source Address | Receive Address | Transmit Address | Coordinate Control IE | Application Control IE | Network Control IE | FCS |
|---|---|---|---|---|---|---|---|---|---|
| | | | | | Route Response | | | | |

WIRELESS COMMUNICATION TERMINAL AND METHOD

CROSS REFERENCE TO RELATED APPLICATIONS

This application is a U.S. National Phase of International Patent Application No. PCT/JP2020/040769 filed on Oct. 30, 2020, which claims priority benefit of Japanese Patent Application No. JP 2019-206204 filed in the Japan Patent Office on Nov. 14, 2019. Each of the above-referenced applications is hereby incorporated herein by reference in its entirety.

TECHNICAL FIELD

The present technology relates to a wireless communication terminal and a wireless communication method, and more particularly to a wireless communication terminal and a wireless communication method that make it possible to execute coordinated transmission via a desired access point.

BACKGROUND ART

In a case of delivering content data existing on the Internet with an existing wireless LAN system, it has been a common method to couple to the Internet via an access point (hereinafter, referred to as an AP) for which a communication terminal of a user has performed association, or via a service provider coupled to the AP. PTL 1 discloses a technique for coupling a mobile phone to a wireless LAN.

Therefore, the user has no other choice, in the communication terminal, but to acquire the content data via the only AP for which the association has been performed, thus making it difficult to view a content satisfactorily in an environment where the coupling to the AP is unstable.

Meanwhile, a technique has currently been put into practical use, in which coordination of a plurality of APs extends a communication range of a signal in a home or in an office space, for example, thus allowing wireless communication to be carried out.

For example, in a case of transmitting content data toward a communication terminal existing at a position where a signal from an AP is weak, coordinated transmission of signals from the plurality of APs enables the communication terminal of a reception destination to receive the content data more securely.

CITATION LIST

Patent Literature

PTL 1: Japanese Unexamined Patent Application Publication No. 2012-217045 1

SUMMARY OF THE INVENTION

Problem to be Solved by the Invention

However, in coordinated transmission that has been put into practical use, there is no other method but to use only APs of the same owner, or a plurality of APs intended by an installer. Consequently, it has been difficult for an existing wireless LAN system to execute coordinated transmission via an arbitrary AP existing around a communication terminal.

The present technology has been made in view of such a circumstance, and makes it possible to execute coordinated transmission via a desired access point.

Means for Solving the Problem

A wireless communication terminal according to a first aspect of the present technology includes a communication control section that starts setting up coordinated transmission in order to cause a plurality of wireless communication apparatuses to execute the coordinated transmission.

In the first aspect of the present technology, coordinated transmission is started to be set up in order to cause a plurality of wireless communication apparatuses to execute the coordinated transmission.

BRIEF DESCRIPTION OF THE DRAWINGS

FIG. 6 illustrates a configuration example of a coordinated transmission request frame.

FIG. 7 illustrates a configuration example of a coordinated transmission control information element.

FIG. 8 illustrates a configuration example of an application control information element.

FIG. 9 illustrates a configuration example of a coordinated transmission indication frame.

FIG. 10 illustrates a configuration example of a coordinated transmission confirmation frame.

FIG. 11 illustrates a configuration example of a network control information element.

FIG. 12 illustrates a configuration example of a coordinated transmission response frame.

FIG. 13 illustrates a configuration example of an application request frame.

FIG. 14 illustrates a configuration example of an application response frame.

FIG. 19 illustrates a configuration example of a route setting request frame.

FIG. 20 illustrates a configuration example of a route setting response frame.

MODES FOR CARRYING OUT THE INVENTION

Hereinafter, description is given of embodiments for carrying out the present technology. The description is given in the following order.

1. First Embodiment (Coordinated Transmission by APs Coupled to Same Provider)
2. Second Embodiment (Coordinated Transmission by APs Coupled to Different Providers)
3. Configuration of Each Communication Apparatus
4. Operation of User terminal
5. Others

1. First Embodiment (Coordinated Transmission by APs Coupled to Same Provider)

<Configuration of Wireless Communication System>

Figure 1:
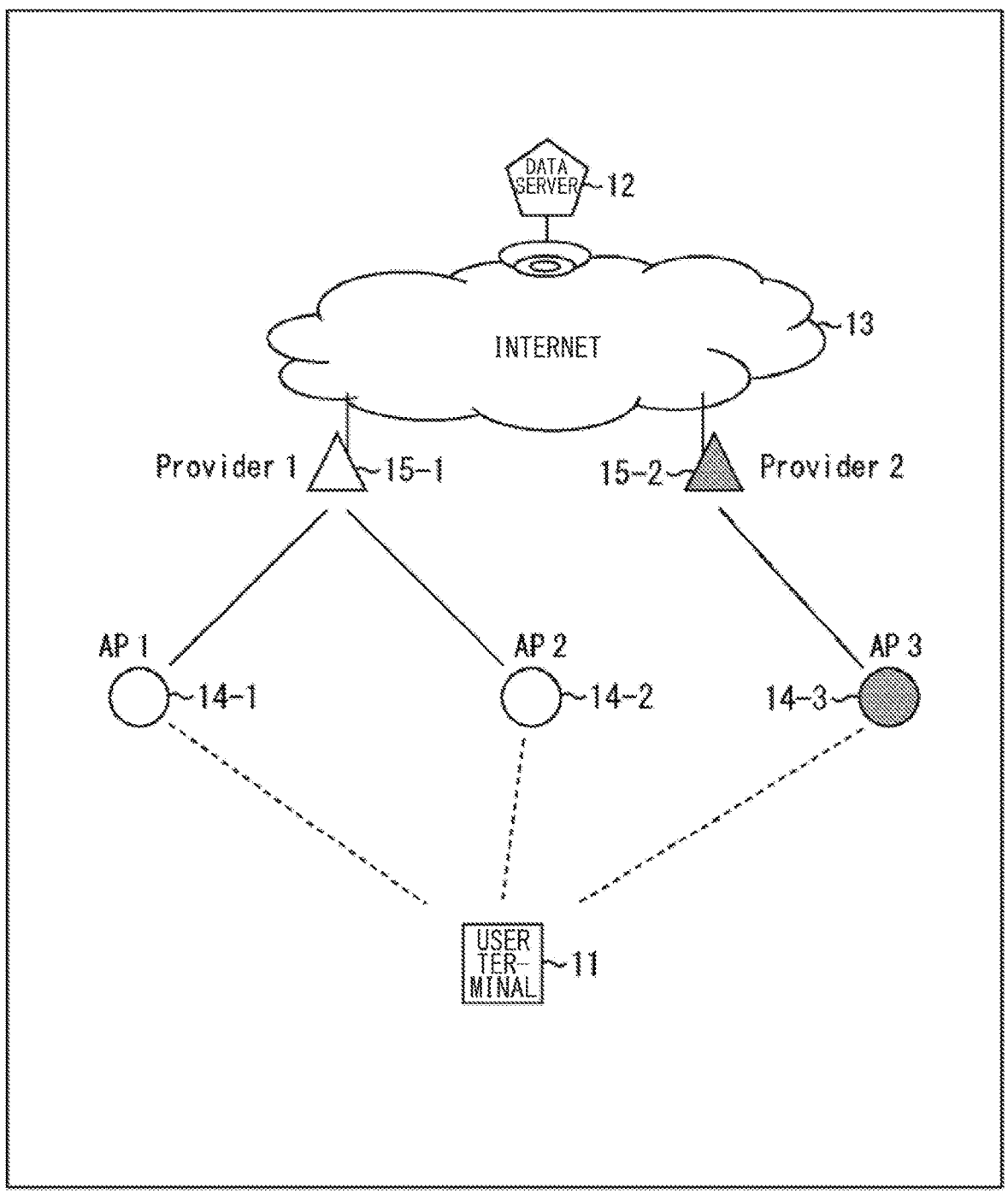
FIG. 1 illustrates a configuration example of a wireless communication system according to an embodiment of the present technology.

FIG. 1 illustrates a configuration example of a wireless communication system according to a first embodiment of the present disclosure.

The wireless communication system in FIG. 1 includes a user terminal 11, AP1 to AP3, Provider1 and Provider2, and a data server 12.

The user terminal 11 is configured by a terminal enabling wireless communication, such as a smartphone, a mobile phone, a mobile terminal, and a personal computer. The user terminal 11 exists at a position enabling coupling to the AP1 to the AP3 by wireless communication.

The data server 12 is a server that stores content data. The data server 12 is mutually coupled to the Provider1 and the Provider2 via Internet 13.

The AP1 and the AP3 are access points to which the user terminal 11 is able to be coupled, and are configured by wireless communication apparatuses 14-1 to 14-3. The AP1 and the AP2 are coupled to the Provider1 by wireless communication or wired communication. The AP3 is coupled to the Provider2 by wireless communication or wired communication. Hereinafter, the wireless communication apparatuses 14-1 to 14-3 are referred to as a wireless communication apparatus 14 in a case where no particular distinction is necessary.

The Provider1 and the Provider2 are each a service provider for the user terminal 11 to be coupled to the Internet 13. The Provider1 and the Provider2 are configured by communication apparatuses 15-1 and 15-2. Hereinafter, the communication apparatuses 15-1 and 15-2 are referred to as a communication apparatus 15 in a case where no particular distinction is necessary.

The wireless communication system in FIG. 1 enables coordinated transmission by a plurality of APs from the data server 12 to the user terminal 11.

The user terminal 11 is coupled to at least two APs of the AP1 or the AP2 coupled to the Provider1 or the AP3 coupled to the Provider2 to thereby be able to receive content data stored in the data server 12 by coordinated transmission via the plurality of APs.

At that time, the user terminal 11 starts setting up coordinated transmission in order to cause a plurality of APs to execute the coordinated transmission. The setup of the coordinated transmission refers to processing of exchanging information to set which AP is to execute the coordinated transmission as a preparation prior to executing the coordinated transmission. The setup of the coordinated transmission is started by performing a setup request for the coordinated transmission.

<Example of AP/Route Setting Screen>

Figure 2:
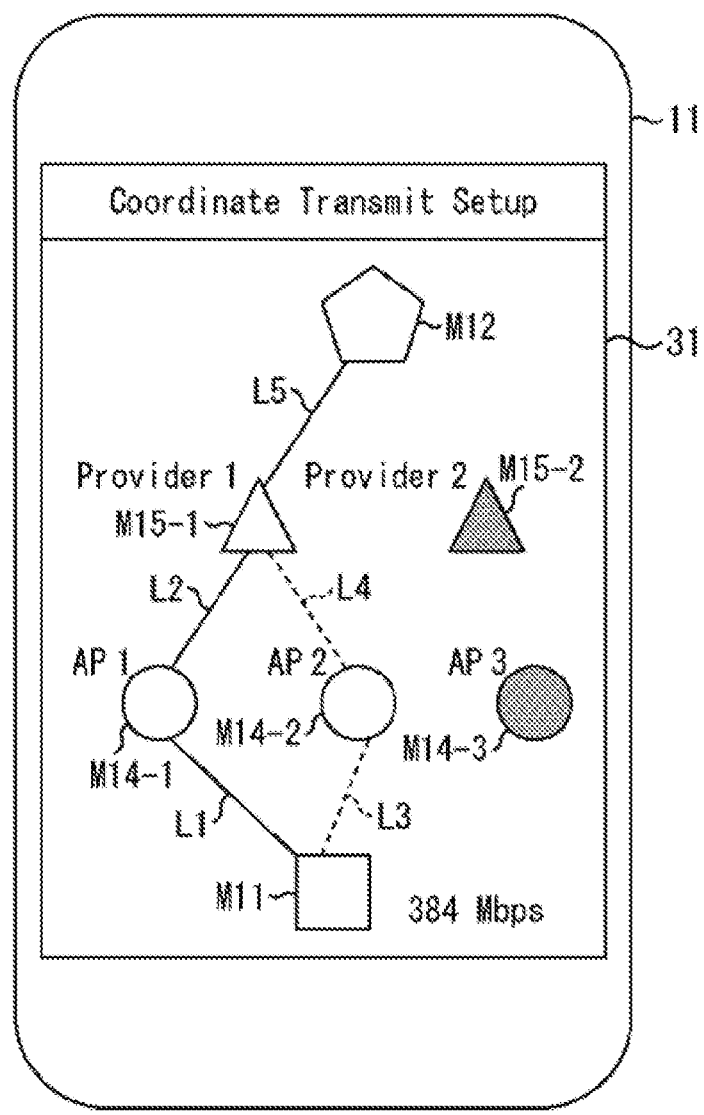
FIG. 2 illustrates an example of an AP/route setting screen.

FIG. 2 illustrates an example of an AP/route setting screen in the user terminal 11.

FIG. 2 illustrates a display unit 31 of the user terminal 11. The display unit 31 illustrates an AP/route setting screen in the wireless communication system in FIG. 1.

The AP/route setting screen is configured to be able to select APs that perform the coordinated transmission and routes from the data server 12 to the user terminal 11 in order to send the content data of the data server 12 to the user terminal 11.

The AP/route setting screen displays icons M11, M12, M14-1 to M14-3, and M15-1 and M15-2 as information indicating instruments included in the wireless communication system in FIG. 1. The icon M11 is an icon indicating the user terminal 11. The icon M12 is an icon indicating the data server 12. The icons M14-1 to M14-3 are icons indicating the AP1 to the AP3, respectively. The icons M15-1 and M15-2 are icons indicating the Provider1 and the Provider2, respectively.

In addition, a route L1 representing a route of data transmission is indicated by a solid line between the icon M11 of the user terminal 11 and the icon M14-1 of the AP1. A route L2 is indicated by a solid line between the icon M14-1 of the AP1 and the icon M15-1 of the Provider1. A route L5 is indicated by a solid line between the icon M15-1 of the Provider1 and the icon M12 of the data server 12. The route indicated by a solid line is a route currently being coupled.

Further, a route L3 is indicated by a broken line between the icon M11 of the user terminal 11 and the icon M14-2 of the AP2. A route L4 is indicated by a broken line between the icon M14-2 of the AP2 and the icon M15-1 of the Provider1. FIG. 2 illustrates the AP/route setting screen in a state where the AP2 and the Provider1 are selected by an instruction of the user, and a route indicated by the broken line represents a route to be selected in a case where the AP2 is selected as an AP enabling coordinated transmission with the AP1.

That is, upon being coupled to the data server 12, the AP/route setting screen displays, in addition to the AP1 being currently in a coupling relationship with the user terminal 11, the AP2 enabling coordinated transmission in a state of being selected by an instruction of the user.

The numerical value (384 Mbps) at the lower right of the AP/route setting screen indicates an estimated maximum throughput speed in a case of using a route selected by selection of APs in addition to the route being currently coupled. It is to be noted that, as the estimated speed, at least one of an estimated speed of a route to be selected by selection of APs or an estimated speed of the route being currently coupled may be displayed. In addition, other than those described above, a communication status and information associated with the communication status may also be displayed.

In addition, it may be possible to perform coordinated transmission using a route coupled via the AP3 and the Provider2, other than the route described above; in order to select this route, the AP/route setting screen displays the icon M14-3 indicating the AP3 and the icon M15-2 indicating the Provider2. However, the AP3 and the Provider2 are coupled via a service provider different from that of the AP1 with which the user terminal 11 is in a coupling relationship, or exist in a different extended service set (ESS), and thus the icon M14-3 and the icon M15-2 are illustrated in a color different (hatched in the drawing) from each instrument existing in the same ESS as that of the AP1.

As described above, a plurality of APs enabling coordinated transmission and a route selected by selection of APs as well as a communication status are displayed sequentially. Accordingly, the user is able to select a plurality of APs executing coordinated transmission and a route to the data server 12 depending on a communication status.

<Example of Communication Sequence>

Figure 3:
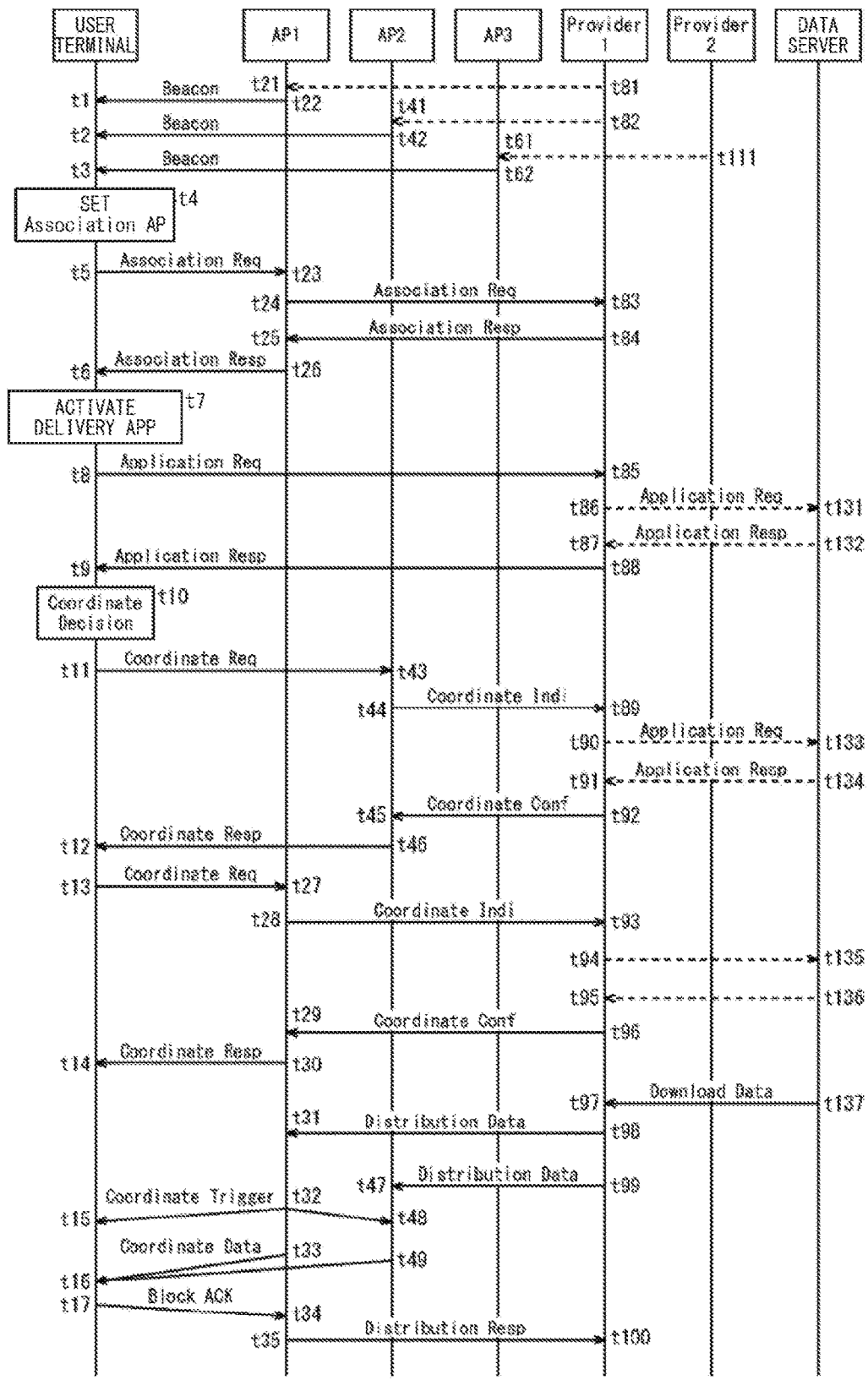
FIG. 3 illustrates a communication sequence of the present technology.

FIG. 3 illustrates a communication sequence of the present technology.

FIG. 3 illustrates flows of signals exchanged among the user terminal 11, the AP1 to the AP3, the Provider1, the Provider2, and the data server 12 in the wireless communication system in FIG. 1. In this communication sequence, passage of time is illustrated from the top to the bottom. Thus, hereinafter, description is given, in order from the top in accordance with the passage of time, of the communication sequence in FIG. 3.

It is to be noted that FIG. 3 gives an example of performing coordinated transmission by the AP1 and the AP2 coupled to the same Provider1.

The Provider1 notifies the AP1 in advance of information such as a predetermined communication parameter at arbitrary time t81.

The AP1 acquires, at time t21, a communication parameter transmitted from the Provider1, and transmits predetermined Beacon at time t22.

The Provider1 notifies the AP2 in advance of information such as a predetermined communication parameter at arbitrary time t82.

The AP2 acquires, at time t41, a communication parameter transmitted from the Provider1, and transmits predetermined Beacon at time t42.

The Provider2 notifies the AP3 in advance of information such as a predetermined communication parameter at arbitrary time t111.

The AP3 acquires, at time t61, a communication parameter transmitted from the Provider2, and transmits predetermined Beacon at time t62.

The user terminal 11 receives, at time t1 to time t3, predetermined Beacons transmitted, respectively, from the AP1 to the AP3.

The user terminal 11 receives the respective predetermined Beacons from the AP1, the AP2, and the AP3 to thereby be able to grasp a circumstance of the APs existing around.

For example, the Beacon may include an information element that includes the following communication parameter information. For example, the information element includes information concerning service providers through which each AP is coupled to the Internet 13, information indicating a route to the data server 12 utilizing a predetermined application, or the like. In addition, the information element may include information indicating communication cost, information concerning service quality, information indicating a degree of stability, information indicating congestion of communication, or the like.

The user terminal 11 sets an AP for which Association is performed on the basis of the information of these Beacons at time t4. That is, on the basis of information, such as SSID (Service Set Identifier) of the AP existing around and a coupling status of the service provider, the user terminal 11 selects, by itself, an appropriate AP (e.g., the AP1) and a service provider corresponding to the AP.

The user terminal 11 transmits an association request (Association Request (Req)) to the AP1 at time t5 in order to be coupled to a desired AP (e.g., the AP1). In addition, the association request may be configured to include an information element that stores information of the data server 12 to be utilized by the predetermined application in the user terminal 11.

The AP1 receives, at time t23, the Association Req transmitted from the user terminal 11. The AP1 transmits the Association Req to the Provider1 at time t24.

The Provider1 receives, at time t83, the Association Req transmitted from the AP1. The Provider1 transmits, to the AP1, Association Response (Association Response (Resp)), which is a response to the Association Req, at time t84.

The AP1 receives, at time t25, the Association Resp transmitted from the Provider1. The AP1 transmits the Association Resp to the user terminal 11 at time t26.

The user terminal 11 receives, at time t6, the Association Resp transmitted from the AP1. At arbitrary time t7, the user terminal 11 activates, by an operation of a user on the user terminal 11, a delivery application that performs a delivery operation of content data. After the activation of the delivery application, for example, a request to receive desired content data is inputted to the user terminal 11 in response to an instruction of the user. The request to receive the content data may be configured to include an information element that stores information of the data server 12 to be utilized by the predetermined application in the user terminal 11.

At time t8, in order for the user to check a route to the data server 12 that stores the desired content data via the service provider to be coupled, the user terminal 11 transmits an application request (Application Req) to the data server 12 via the Provider1. It is to be noted that, although not illustrated in FIG. 3, the Application Req is transmitted, in reality, from the user terminal 11 to the Provider1 via the AP1. A configuration of an Application Request frame is described later with reference to FIG. 13.

The Provider1 receives, at time t85, the Application Req transmitted from the user terminal 11. The Provider1 transmits the Application Req to the data server 12 at time t86.

The data server 12 receives, at time t131, the Application Req transmitted from the Provider1. The data server 12 transmits, to the Provider1, an application response (Application Resp), which is a response to the Application Req, at time t132. A configuration of an Application Response frame is described later with reference to FIG. 14.

The Provider1 receives, at time t87, the Application Resp transmitted from the data server 12. The Provider1 transmits the Application Resp to the user terminal 11 at time t88. It is to be noted that, although not illustrated in FIG. 3, the Application Resp is transmitted, in reality, from the Provider1 to the user terminal 11 via the AP1.

Here, the setting of the AP for which the Association is performed at t4 and the activation of the delivery application at t7 may be performed sequentially. In this case, for example, the Association Req via the AP1 and the Application Req are sequentially transmitted and received between the user terminal 11 and the Provider1. Then, the Application Req and the Application Resp are transmitted and received between the Provider1 and the data server 12. After the transmission and the reception, the Application Resp and the Association Resp via the AP1 are sequentially transmitted and received between the user terminal 11 and the Provider1.

In addition, the activation method and a timing of the delivery application are not limited to the above-described activation method and timing, and may be arbitrarily set. For example, the delivery application may be activated automatically upon power on to allow access to a predetermined data server, or the user may input an address of the data server on a screen on the delivery application in a case of viewing the screen.

The user terminal 11 decides at time t10 whether or not Coordinate Decision, i.e., the coordinated transmission is necessary.

Here, in a case where a decision is made that the coordinated transmission is necessary, a plurality of APs performing the coordinated transmission may be automatically decided by the user terminal 11 by collecting and analyzing information on the Beacon, information on the Association Resp, and information on the Application Resp. In addition, the plurality of APs performing the coordinated transmission may be decided by selection by the user by displaying the AP/route setting screen in FIG. 2 generated on the basis of the information on the Beacon, the information on the Association Resp, and the information on the Application Resp.

In a case where coordinated transmission of the AP1 and the AP2 is necessary, for example, the user terminal 11 starts setting up the coordinated transmission. That is, at time t11, the user terminal 11 transmits a coordinated transmission request (Coordinate Req) to the AP2 as a setup request for the coordinated transmission. A configuration of a Coordinate Request frame is described later with reference to FIG. 6.

The AP2 receives, at time t43, the Coordinate Req transmitted from the user terminal 11. At time t44, the AP2 transmits coordinated transmission indication (Coordinate Indication (Indi)) to the Provider1 to notify a setting request for the coordinated transmission. A configuration of a Coordinate Indication frame is described later with reference to FIG. 9.

The Provider1 receives, at time t89, the Coordinate Indi transmitted from the AP2. At time t90, the Provider1 transmits the Application Req to the data server 12 as needed to thereby notify a setting request for the coordinated transmission. It is to be noted that the notification of the request for the coordinated transmission to the database 12 is not necessarily required because of a notification from the same the Provider1 for which the AP1 has performed the association.

The data server 12 receives, at time t133, the Application Req transmitted from the Provider1. The data server 12 transmits the Application Resp to the Provider1 at time t134.

The Provider1 receives, at time t91, the Application Resp transmitted from the data server 12. This allows for confirmation of the coupling to the data server 12, and thus the Provider1 transmits coordinated transmission confirmation (Coordinate Confirmation (Conf)) to the AP2 at time t92. A configuration of a Coordinate Confirmation frame is described later with reference to FIG. 10.

The AP2 receives, at time t45, the Coordinate Conf transmitted from the Provider1. The AP transmits, to the user terminal 11, a coordinated transmission response (Coordinate Resp), which is a response to the Coordinate Conf, at time t46. A configuration of a Coordinate Response frame is described later with reference to FIG. 12.

The user terminal 11 receives, at time t12, the Coordinate Resp transmitted from the AP2. The user terminal 11 transmits the Coordinate Req to the AP1 at time t13.

Meanwhile, the AP1 receives, at time t27, the Coordinate Req transmitted from the user terminal 11. At time t28, the AP1 transmits the Coordinate Indi to the Provider1 to notify a setting request for the coordinated transmission.

The Provider1 receives, at time t93, the Coordinate Indi transmitted from the AP1. The Provider1 notifies a start of the coordinated transmission at time t94 because the coupling to the data server 12 has already been confirmed at time t87 described above. As the notification, the Application Req may be transmitted similarly to the case of the AP2.

The data server 12 receives, at time t135, the notification transmitted from the Provider1, and transmits a response to the notification to the Provider1 at time t136.

The Provider1 receives, at time t95, the response transmitted from the data server 12, and transmits the Coordinate Conf to the AP1 at time t96.

The AP1 receives, at time t29, the Coordinate Conf transmitted from the Provider1. The AP1 transmits the Coordinate Resp to the Coordinate Conf to the user terminal 11 at time t30.

The user terminal 11 receives, at time t14, the Coordinate Resp transmitted from the AP1. After receiving the Coordinate Resp, a reception setting is performed in the user terminal 11, for the coordinated transmission being carried out from each AP.

Through those described above, the coordinated transmission by the plurality of APs has been prepared. It is to be noted that, although the description has been given in FIG. 3 of the example in which the request for the coordinated transmission is made from the AP2, the request for the coordinated transmission may also be made from the AP1.

Then, the data server 12 transmits content data (Download Data) to the Provider1 at time t137.

At time t97, the Provider1 receives the content data transmitted from the data server 12 to generate respective pieces of distribution content data (Distribution Data) to be distributed to the AP1 and the AP2.

The Provider1 transmits the Distribution Data to the AP1 at time t98, and transmits the Distribution Data to the AP2 at time t99.

The AP1 receives, at time t31, the Distribution Data transmitted from the Provider1. The AP2 receives, at time t47, the Distribution Data transmitted from the Provider1.

The AP1 transmits a coordinated transmission trigger (Coordinate trigger) at time t32.

The AP2 receives, at time t48, the Coordinate trigger transmitted from the AP1. The user terminal 11 receives, at time t5, the Coordinate trigger transmitted from the AP1.

At time t33 and time t49 (the same timing), the AP1 and the AP2 transmit, as coordinated transmission data (Coordinate Data), the Distribution Data to the user terminal 11 on the basis of the Coordinate trigger.

The user terminal 11 receives, at time t16, the Coordinate Data transmitted from the AP1 and the Coordinate Data transmitted from the AP2. In a case where all pieces of data are received correctly, the user terminal 11 returns an acknowledgment (Block ACK) to the AP1 at time t17. It is to be noted that the AP to which user terminal 11 returns the Block ACK is an AP that performs a retransmission control, and may be the AP2 as long as the AP2 performs the retransmission control.

The AP1 receives, at time t34, the Block ACK transmitted from the user terminal 11. In a case where a determination is made, on the basis of the Block ACK, that all the pieces of data are sent correctly to the user terminal 11, the AP1 transmits, to the Provider1, Distribution Resp, which is a response to the Distribution Data, as needed at time t35.

The Provider1 receives, at time t100, the Distribution Resp transmitted from the AP1, and then the coordinated transmission of the content data (Download Data) transmitted at time t137 is completed.

It is to be noted that, although the description has been given of the example in which the user terminal 11 automatically selects an AP when setting the AP for which Association is performed at time t4 in FIG. 3, it may also be possible to cause the user to select a desired AP by displaying a setting screen for an Association AP. In addition, although the description has been given of the example in which the user terminal 11 automatically selects a data server when activating the delivery application at time t7 in FIG. 3, the user may select a data server by displaying a setting screen for the delivery application.

<Example of Setting Screen for Association AP>

Figure 4:
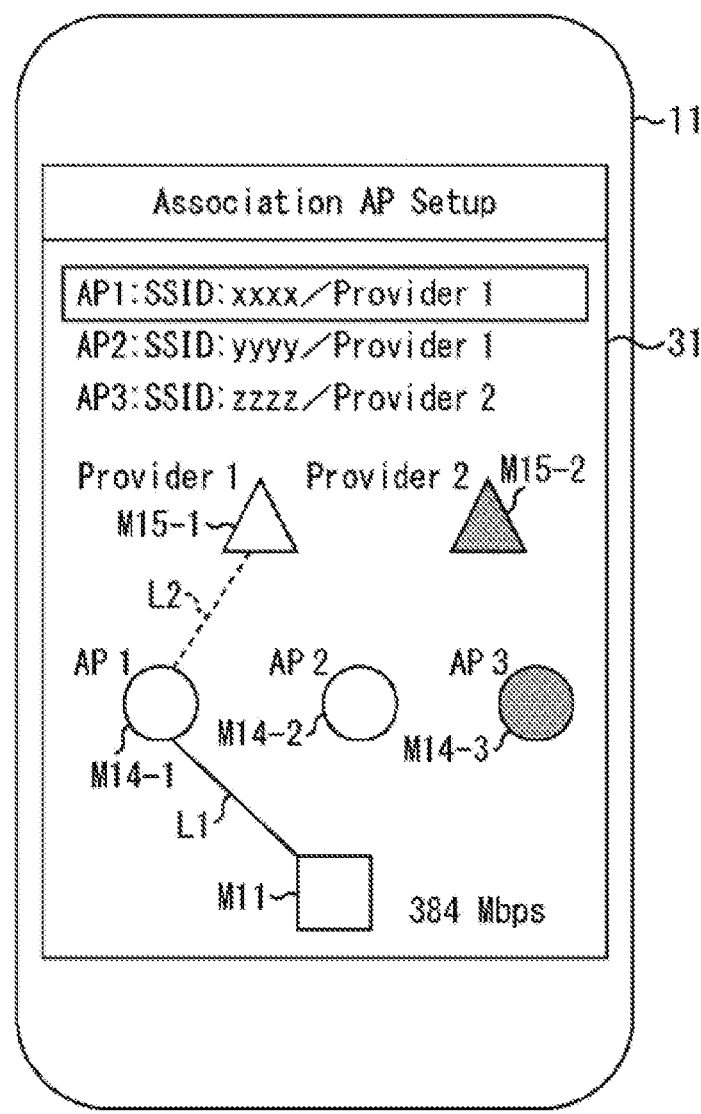
FIG. 4 illustrates an example of a setting screen for Association AP.

FIG. 4 illustrates an example of a setting screen for the Association AP in the user terminal 11.

The display unit 31 of the user terminal 11 illustrated in FIG. 4 displays a setting screen for the Association AP in the wireless communication system in FIG. 1.

The setting screen for the Association AP includes information concerning APs, which enable coupling and exist around the user terminal 11, and is configured to enable the user to select an optimum AP using the setting screen for the Association AP, upon coupling to the data server 12.

At the upper portion of the setting screen for the Association AP, information (such as information on SSID or coupling to service providers) concerning the AP1 to the AP3, that are able to be coupled to the user terminal 11 in the wireless communication system in FIG. 1, is displayed to be selectable by the user using a cursor.

At the lower portion of the setting screen for the Association AP, there are displayed the icon M11 of the user terminal 11, the icons M14-1 to M14-3 indicating the AP1 to the AP3, and the icons M15-1 and M15-2 indicating the Provider1 and the Provider2. In addition, the route L1 between the user terminal 11 and the AP1 selected with the cursor is indicated by a solid line between the icon M11 of the user terminal 11 and the icon M14-1 of the AP1. In addition, the route L2 programed to be coupled by coupling between the user terminal 11 and the AP1 is indicated by a broken line between the icon M14-1 of the AP1 and the icon M15-1 of the Provider1.

The user is able to select an AP for which the Association is sought by viewing the setting screen for the Association AP and operating an icon of the desired AP by clicking, for example.

<Example of Setting Screen for Data Server>

Figure 5:
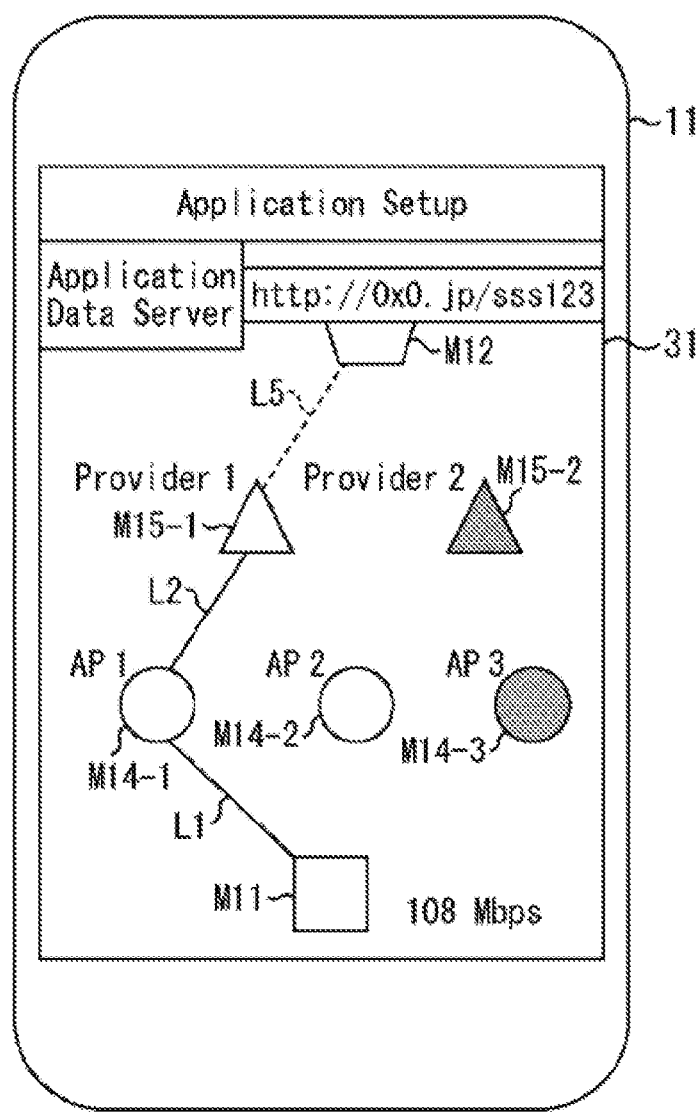
FIG. 5 illustrates an example of a setting screen for a data server.

FIG. 5 illustrates an example of a setting screen for a data server in the user terminal 11.

The display unit 31 of the user terminal 11 illustrated in FIG. 5 displays the setting screen for the data server in the wireless communication system in FIG. 1. The setting screen for this data server is displayed after the activation of the delivery application, for example.

The upper portion of the setting screen for the data server is configured to enable a data server to be selected by inputting a URL, or the like of the data server that is able to deliver content data of the delivery application.

In addition, at the lower portion of the setting screen for the data server, there are displayed the icon M11 of the user terminal 11, the icons M14-1 to M14-3 indicating the AP1 to the AP3, the icons M15-1 and M15-2 indicating the Provider1 and the Provider2, and the icon M12 of the data server 12. In addition, the routes L1 and L2 indicating that they are currently being coupled is indicated by solid lines between the icon M11 of the user terminal 11 and the icon M14-1 of the AP1 and between the icon M14-1 of the AP1 and the icon M15-1 of the Provider1. In addition, the route L5 that is to be coupled from now is indicated by a broken line between the icon M15-1 of the Provider1 and the data server 12.

The user is able to select a data server from which the content data is acquired by viewing the setting screen for the data server and inputting a URL or the like of the desired data server, for example.

<Configuration Example of Coordinated Transmission Request Frame>

FIG. 6 illustrates a configuration example of a coordinated transmission request frame (Coordinate Request frame).

The coordinated transmission request frame in FIG. 6 is transmitted from the user terminal 11 toward the AP for setting up the coordinated transmission.

As for a configuration of the coordinated transmission request frame, there are included, subsequent to a MAC header, a coordinated transmission control information element (Coordinate Control IE) and an application control information element (Application Control IE), with an FCS (Frame Check Sequence) being added to the end of the frame. It is to be noted that the coordinated transmission control information element and the application control information element are each described later in detail with respect to FIGS. 7 and 8.

In addition, the MAC header of the coordinated transmission request frame includes parameters such as Frame Control, Duration, Destination Address, Source Address, Receive Address, Transmit Address, and Sequence Control.

The Frame Control represents a frame format. The Duration represents frame duration time. The Destination Address is an address to identify an apparatus of a sending destination. The Source Address is an address to identify an apparatus of a sending source. The Receive Address is an address to identify an apparatus of a reception destination. The Transmit Address is an address to identify an apparatus of a transmission destination. The Sequence Control is information indicating sequence control. The FCS is an error-detecting code of a frame.

<Configuration Example of Coordinated Transmission Control Information Element>

FIG. 7 illustrates a configuration example of coordinated transmission control information element.

The coordinated transmission control information element in FIG. 7 includes IE Type to identify a predetermined information element, Length indicating the length of information, and parameters necessary to set up the coordinated transmission.

The parameters necessary to set up the coordinated transmission include Terminal Address, Coordinate AP Address, Coordinate AP Address, Operator Info, Provider Info, Database Address, Application Type, and the like.

The Terminal Address is an address of a user terminal. The Coordinate AP Address represents addresses of a plurality of APs performing the coordinated transmission. The Operator Info is information to identify a communication carrier as needed. The Provider Info is information to identify a service provider. The Database Address is an address of the data server. The Application Type is information indicating a format of the delivery application.

<Configuration Example of Application Control Information Element>

FIG. 8 illustrates a configuration example of an application control information element.

The application control information element in FIG. 8 includes IE Type to identify a predetermined information element, Length indicating the length of information, and parameters necessary to set up the application.

The parameters necessary to set up the application include Terminal Address, Database Address, Application Type, Service Type, Contents Directory, Contents Filename, File Type, File Size, and the like.

The Terminal Address is an address of the user terminal. The Database Address is an address of the data server. The Terminal Address and the Database Address allow for identification of end-to-end coupling.

The Application Type is information indicating a format of the delivery application. The Service Type is information to identify a service of the delivery application to be operated. The Contents Directory is information on a directory of a content stored in the data server. The Contents Filename is information indicating a filename of the content. The File Type is information indicating a file format of the content. The File Size is information indicating a file size of the content.

<Configuration Example of Coordinated Transmission Display Frame>

FIG. 9 illustrates a configuration example of a coordinated transmission indication frame (Coordinate Indication frame).

It is to be noted that description overlapping the description in FIG. 6 is omitted as appropriate. The same applies to subsequent drawings.

The coordinated transmission indication frame in FIG. 9 is transmitted from the AP toward a service provider for setting up the coordinated transmission.

The configuration of the coordinated transmission indication frame includes, subsequent to a MAC header, the coordinated transmission control information element in FIG. 7 and the application control information element in FIG. 8, with the FCS being added to the end of the frame.

In addition, the MAC header of the coordinated transmission indication frame includes parameters such as Frame Control, Duration, Destination Address, Source Address, Receive Address, Transmit Address, and Sequence Control.

<Configuration Example of Coordinated Transmission Confirmation Frame>

FIG. 10 illustrates a configuration example of a coordinated transmission confirmation frame (Coordinate Confirmation frame).

The coordinated transmission confirmation frame in FIG. 10 is transmitted from a service provider toward the AP for setting up the coordinated transmission.

The configuration of the MAC header of the coordinated transmission confirmation frame includes, subsequent to the MAC header, the coordinated transmission control information element in FIG. 7, the application control information element in FIG. 8, and a network control information element (Network Control IE) in FIG. 11 described later, with the FCS being added to the end of the frame.

In addition, the MAC header of the coordinated transmission confirmation frame includes parameters such as Frame Control, Duration, Destination Address, Source Address, Receive Address, and Transmit Address.

<Configuration Example of Network Control Information Element>

FIG. 11 illustrates a configuration example of a network control information element.

The network control information element in FIG. 11 includes IE Type to identify a predetermined information element, Length indicating the length of information, and parameters necessary to select an AP allowing coordinated transmission to be executed (started) and to set up setting of a communication route.

The parameters necessary to select an AP allowing coordinated transmission to be executed (started) and to set up setting of a communication route include Support Protocol, Version, Attribute, Throughput, Cost, Speed, Latency, Delay, Congestion, and the like.

The Application Type is information indicating a supporting protocol. The Version is network version information. The Attribute is information indicating an attribute of the network. The Throughput is information indicating a throughput capacity of the network. The Cost is information indicating the cost of the network. The Speed is information indicating a communication speed of the network. The Latency is information indicating latency of the network. The Delay is information indicating the amount of delay in the network. The Congestion is information indicating a congestion status of the network.

<Configuration Example of Coordinated Transmission Response Frame>

FIG. 12 illustrates a configuration example of a coordinated transmission response frame (Coordinate Response frame).

The coordinated transmission response frame in FIG. 12 is transmitted from the AP toward the user terminal 11 for setting up the coordinated transmission.

The configuration of the coordinated transmission response frame includes, subsequent to the MAC header, the coordinated transmission control information element in FIG. 7, the application control information element in FIG. 8, and the network control information element in FIG. 11, with the FCS being added to the end of the frame.

In addition, the MAC header of the coordinated transmission response frame includes parameters such as Frame Control, Duration, Destination Address, Source Address, Receive Address, and Transmit Address.

<Configuration Example of Application Request Frame>

FIG. 13 illustrates a configuration example of an application request frame (Application Request frame).

The application request frame in FIG. 13 is transmitted from the service provider toward the data server 12 for setting up the application.

The configuration of the Application Request frame includes, subsequent to the MAC header, the application control information element in FIG. 8, with the FCS being added to the end of the frame.

The MAC header of the application request frame includes parameters such as Frame Control, Duration, Destination Address, Source Address, Receive Address, Transmit Address, Sequence Control, and QoS Control.

The QoS Control is service quality control information.

<Configuration Example of Application Response Frame>

FIG. 14 illustrates a configuration example of an application response frame (Application Response frame).

The application response frame in FIG. 14 is transmitted from the data server 12 toward the service provider for setting up the application.

The configuration of the application response frame includes, subsequent to the MAC header, the application control information element in FIG. 8 and the network control information element in FIG. 11, with the FCS being added to the end of the frame.

In addition, the MAC header of the application response frame includes parameters such as Frame Control, Duration, Destination Address, Source Address, Receive Address, Transmit Address, and Sequence Control.

<Configuration Example of Data Frame to be Transmitted in Coordinated Manner>

Figure 15:
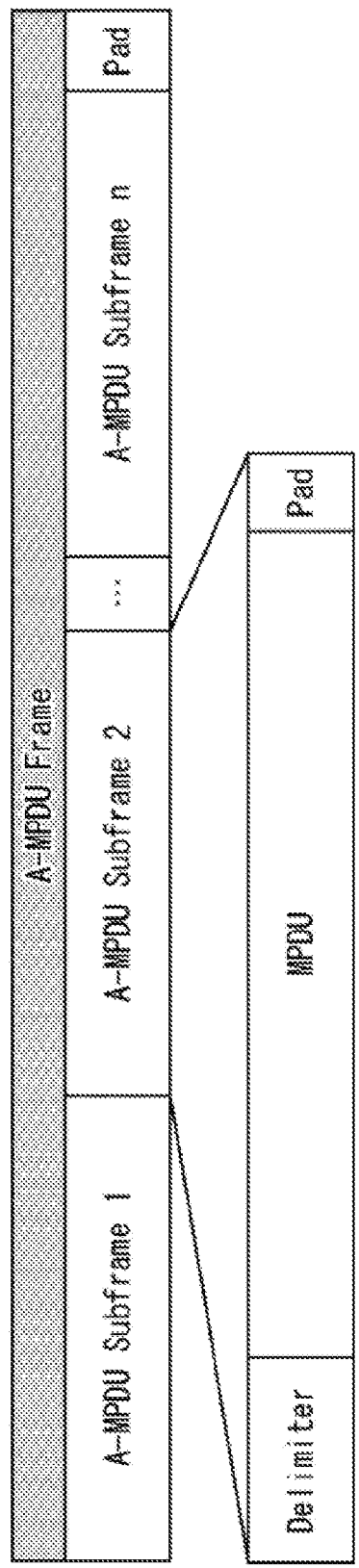
FIG. 15 illustrates a configuration example of a data frame to be transmitted in a coordinated manner.

FIG. 15 illustrates a configuration example of a data frame to be transmitted in a coordinated manner.

The data frame in FIG. 15 is a typical A-MPDU (Aggregation MAC protocol data unit) frame, and is configured by adding Padding (Pad) to the end of a plurality of A-MPDU subframes as needed.

The A-MPDU sub-frame is configured by adding Padding to the end of MPDU including the actual data and delimiter (Delimiter) as needed.

<Configuration Example of Block Ack Frame>

Figure 16:
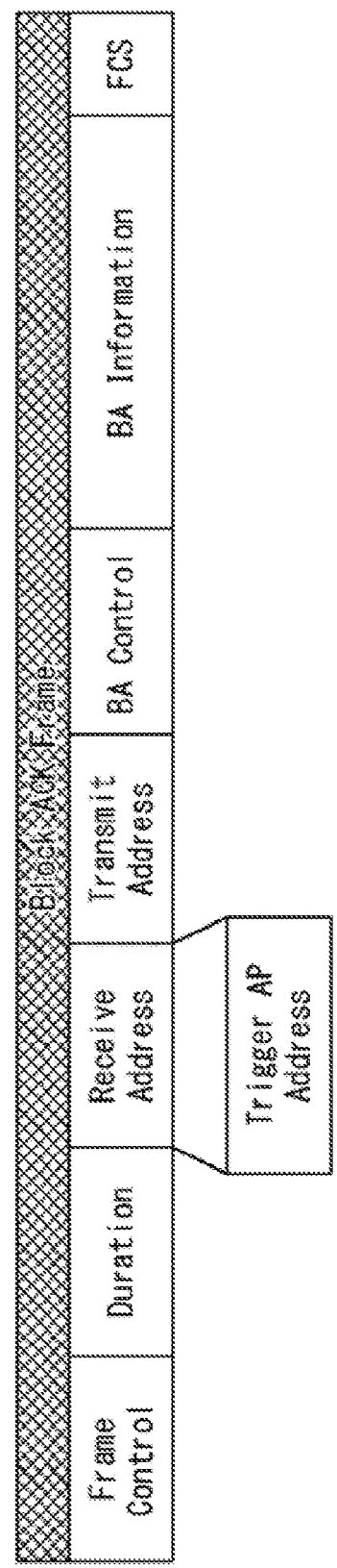
FIG. 16 illustrates a configuration example of a Block ACK frame.

FIG. 16 illustrates a configuration example of a Block ACK frame.

The Block ACK frame in FIG. 16 includes Frame Control, Duration, Receive address (RA), Transmit Address (TA), BA Control, BA Information, FCS, and the like.

The Frame Control is information indicating frame control. The Duration is information indicating frame duration time. The Receive address is a reception destination address. The Transmit Address is a transmission source address. The BA Control is information indicating Block ACK control. The BA Information is information concerning the Block ACK.

It is to be noted that, in the present technology, for returning to the AP transmitting a trigger frame of the coordinated transmission, the reception destination of the Block ACK may also be configured to be designated as Trigger AP Address instead of the Receive address.

<<2. Second Embodiment (Coordinated Transmission by APs Coupled to Different Providers)>>

<Another Example of AP/Route Setting Screen>

Figure 17:
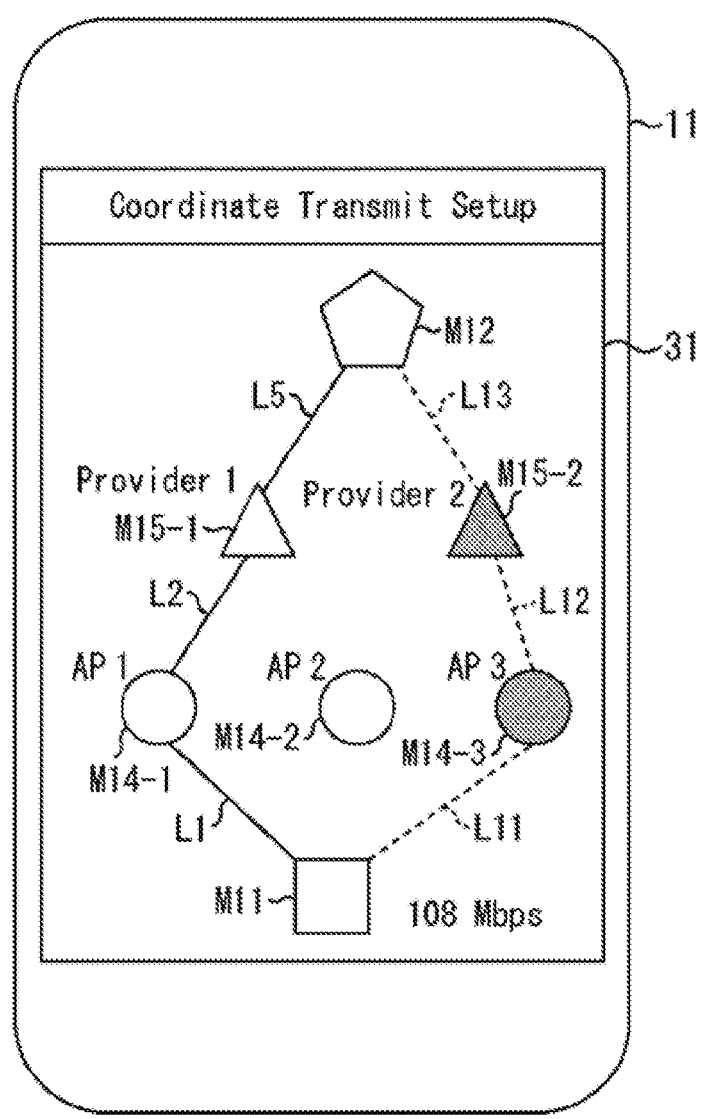
FIG. 17 illustrates another example of the AP/route setting screen.

FIG. 17 illustrates another example of the AP/route setting screen in the user terminal 11.

It is to be noted that description overlapping the description in FIG. 2 is omitted as appropriate.

In the AP/route setting screen in FIG. 17, an example is given in which coordinated transmission by the AP1 to be coupled to the Provider1 and the AP3 to be coupled to the Provider2 different from the Provider1 is selected.

Similarly to the case of FIG. 2, the routes L1, L2, and L5, which are routes being currently coupled, are each indicated by a solid line.

Unlike the case in FIG. 2, in the case of FIG. 17, a route L11 illustrated between the icon M11 and the icon M14-3, a route L12 illustrated between the icon M14-3 and the icon M15-2, and a route L13 illustrated between the icon M15-2 and the icon M12 are indicated by broken lines. FIG. 17 illustrates the AP/route setting screen in a state where the AP3 and the Provider2 are selected by an instruction of the user, and a route indicated by the broken line represents a route to be coupled in a case where the AP3 is selected as an AP enabling coordinated transmission with the AP1.

That is, upon being coupled to the data server 12, the AP/route setting screen displays, in addition to the AP1 being currently in a coupling relationship with the user terminal 11, the AP3 to be coupled to the Provider2 different from the Provider1 in a state of being selected by an instruction of the user.

It is to be noted that, also in the case of FIG. 17, at the lower right of the AP/route setting screen, there is indicated an estimated maximum throughput speed in a case of using a route selected by selection of APs in addition to the route being currently coupled. It is to be noted that, as the estimated speed, at least one of an estimated speed of a route to be selected by selection of APs or an estimated speed of the route being currently coupled may be displayed. In addition, other than those described above, such a communication status and information associated with the communication status may also be displayed.

As described above, routes selected by the selection of the APs, including a route having a different service provider, are displayed sequentially, thus enabling the user to select a plurality of APs executing the coordinated transmission and routes to the data server 12, depending on a communication status.

<Another Example of Communication Sequence>

Figure 18:
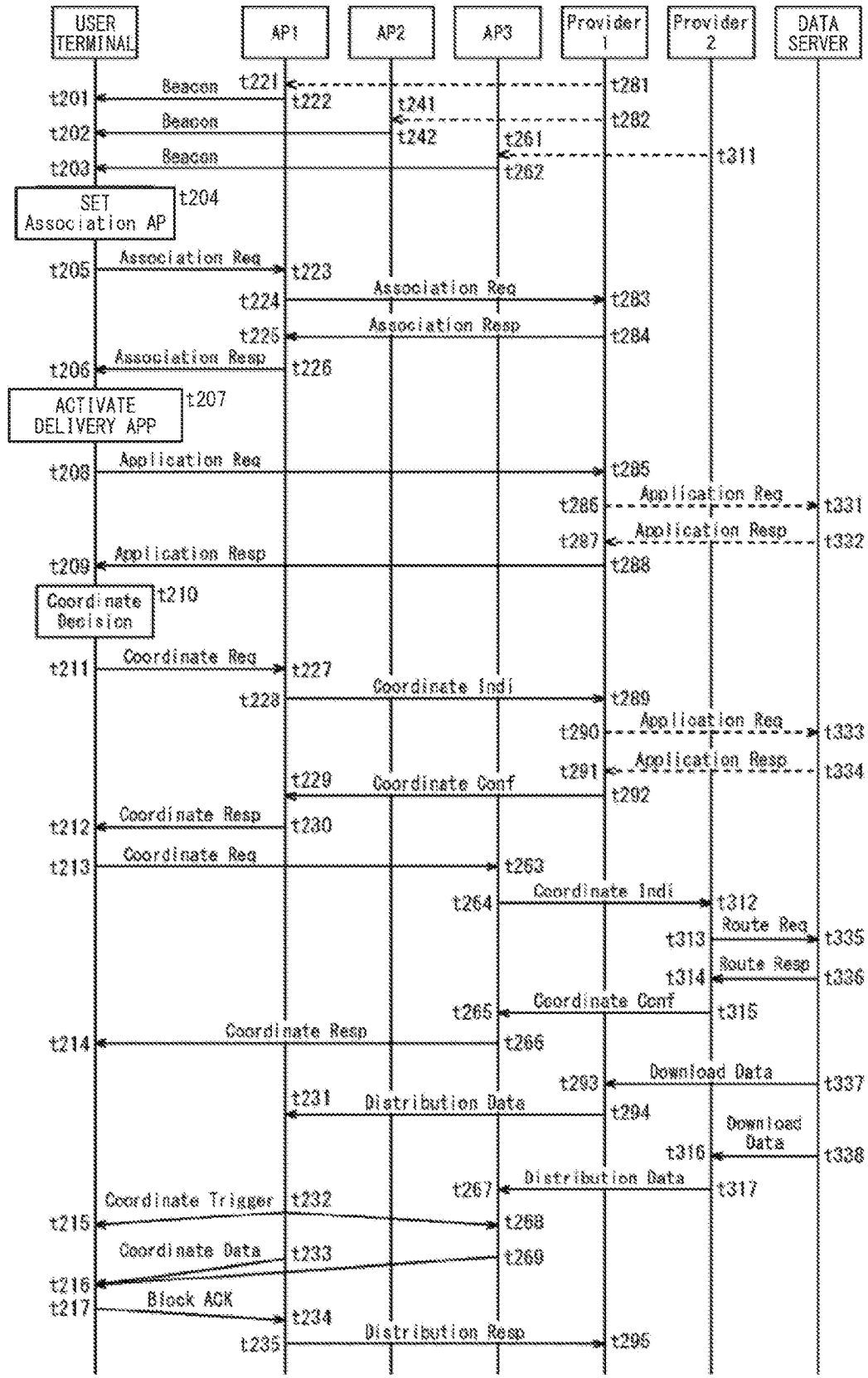
FIG. 18 illustrates another example of the communication sequence of the present technology.

FIG. 18 illustrates another example of the communication sequence of the present technology.

FIG. 18 illustrates flows of signals exchanged among the user terminal 11, the AP1 to the AP3, the Provider1, the Provider2, and the data server 12 in the wireless communication system in FIG. 1. In this communication sequence, passage of time is illustrated from the top to the bottom. Thus, hereinafter, description is given, in order from the top in accordance with the passage of time, of the communication sequence.

FIG. 18 gives an example of performing coordinated transmission by the AP1 coupled to the Provider1 and the AP3 coupled to the Provider2 different from the Provider1.

It is to be noted that, at time t201 to time t209, time t221 to time t226, step time t241, and time t242 in FIG. 18, pieces of processing are performed which are similar to those at time t1 to time t9, time t21 to time t26, time t41, and time t42 in FIG. 3; thus, descriptions thereof are omitted.

Further, at time t281 to time t288, time t311, time t331, and time t332 in FIG. 18, pieces of processing are performed which are similar to those at time t81 to time t88, time t111, time t131, and time t132 in FIG. 3; thus, descriptions thereof are omitted.

The user terminal 11 decides at time t210 whether or not the coordinated transmission is necessary.

Here, in a case where a decision is made that the coordinated transmission is necessary, similarly to the case of FIG. 3, a plurality of APs performing the coordinated transmission may be automatically decided by the user terminal 11 by collecting and analyzing information on the Beacon, information on the Association Resp, and information on the Application Resp. In addition, the plurality of APs performing the coordinated transmission may be decided by selection of the user by displaying the AP/route setting screen in FIG. 17 generated on the basis of the information on the Beacon, the information on the Association Resp, and the information on the Application Resp.

In a case where coordinated transmission of the AP1 and the AP3 is necessary, for example, the user terminal 11 transmits the Coordinate Req to the AP1 at time t211.

The AP1 receives, at time t227, the Coordinate Req transmitted from the user terminal 11. At time t228, the AP1 transmits the Coordinate Indi to the Providers to notify a setting request for the coordinated transmission.

The Provider1 receives, at time t289, the Application Req transmitted from the AP2. At time t290, the Provider1 transmits the Application Req to the data server 12 as needed to thereby notify a setting request for the coordinated transmission.

The data server 12 receives, at time t333, the Application Req transmitted from the Provider1. The data server 12 transmits the Application Resp to the Provider1 at time t334.

The Provider1 receives, at time t291, the Application Resp transmitted from the data server 12. This allows for confirmation of the coupling to the data server 12, and thus the Provider1 transmits the Coordinate Conf to the AP1 at time t292.

The AP1 receives, at time t229, the Coordinate Conf transmitted from the Provider1. The AP transmits, to the user terminal 11, the Coordinate Resp to the Coordinate Conf at time t230.

The user terminal 11 receives, at time t212, the Coordinate Resp transmitted from the AP1. Further, the user terminal 11 transmits the Coordinate Req to the AP3 at time t213.

The AP3 receives, at time t263, the Coordinate Req transmitted from the user terminal 11. At the time t264, the AP3 transmits the Coordinate Indi to the Provider2 to notify a setting request for the coordinated transmission.

The Provider2 transmits a route setting request (Route Req) at time t312 because no coupling to the data server 12 has yet been confirmed. A configuration of a Route Request frame is described later with reference to FIG. 19.

The data server 12 receives, at time t335, the Route Req transmitted from the Provider2, and transmits, to the Provider2, a route setting response (Route Resp), which is a response to the Route Req, at time t336. A configuration of a Route Response frame is described later with reference to FIG. 20.

The Provider2 receives, at time t314, the Route Resp transmitted from the data server 12, and transmits the Coordinate Conf to the AP3 at time t315.

The AP3 receives, at time t265, the Coordinate Conf transmitted from the Provider2. The AP3 transmits the Coordinate Resp to the Coordinate Conf to the user terminal 11 at time t266.

The user terminal 11 receives, at time t214, the Coordinate Resp transmitted from the AP3. After receiving the Coordinate Resp, a reception setting is performed in the user terminal 11, for the coordinated transmission being carried out from each AP.

Through those described above, the coordinated transmission by the plurality of AP1 to AP3 has been prepared. Thus, coordinated transmission is prepared by a plurality of the AP1 and the AP3.

Then, the data server 12 transmits the content data (Download Data) to the Provider1 at time t337.

At time t293, the Provider1 receives the Download Data transmitted from the data server 12, and generates the Distribution Data to be distributed to the AP1. The Provider1 transmits the Distribution Data to the AP1 at time t294. The AP1 receives the Distribution Data at time t231.

In addition, the data server 12 transmits the Download Data to the Provider2 at time t338.

The Provider2 receives, at time t316, the Download Data transmitted from the data server 12, and generates the Distribution Data to be distributed to the AP3. The Provider2 transmits the Distribution Data to the AP3 at time t317.

The AP3 receives, at time t267, the Distribution Data transmitted from the Provider2.

The AP1 transmits the coordinated transmission trigger (Coordinate trigger) at time t232.

The AP3 receives, at time t268, the Coordinate trigger transmitted from the AP1. The user terminal 11 receives, at time 215, the Coordinate trigger transmitted from the AP1.

At time t233 and time t269 (the same timing), the AP1 and the AP3 transmit, as the coordinated transmission data (Coordinate Data), the Distribution Data to the user terminal 11.

The user terminal 11 receives, at time t216, the Coordinate Data transmitted from the AP1 and the Coordinate Data transmitted from the AP2. In a case where all pieces of data have been received correctly, the user terminal 11 returns the Block ACK to the AP1 at time t217. It is to be noted that the AP to which user terminal 11 returns the Block ACK is an AP that performs a retransmission control, and may be the AP3 as long as the AP3 performs the retransmission control.

The AP1 receives, at time t234, the Block ACK transmitted from the user terminal 11. In a case where a determination is made, on the basis of the Block ACK, that all pieces of data have been correctly sent to the user terminal 11, the AP1 transmits the Distribution Resp to the Provider1 as needed at time 235.

The Provider1 receives, at time t295, the Distribution Resp transmitted from the AP1, and then the coordinated transmission of the content data (Download Data) transmitted at time t337 and time t338 is completed.

<Configuration Example of Route Setting Request Frame>

FIG. 19 illustrates a configuration example of a route setting request frame.

The route setting request frame in FIG. 19 is used in a case of being transmitted from the service provider toward the data server 12 for setting up a transmission route of the content data, and is described as the Route Request frame.

The configuration of the MAC header of the route setting request frame includes, subsequent to the MAC header, the coordinated transmission control information element in FIG. 7 and the application control information element in FIG. 8, with the FCS being added to the end of the frame.

In addition, the MAC header of the route setting request frame includes parameters such as Frame Control, Duration, Destination Address, Source Address, Receive Address, Transmit Address, and Sequence Control.

<Configuration Example of Route Setting Response Frame>

FIG. 20 illustrates a configuration example of a route setting response frame (Route Response frame).

The route setting response frame in FIG. 20 is transmitted from the data server 12 toward the service provider for setting up a transmission route.

The configuration of the route setting response frame includes, subsequent to the MAC header, the coordinated transmission control information element in FIG. 7, the application control information element in FIG. 8, and the network control information element in FIG. 11, with the FCS being added to the end of the frame.

In addition, the MAC header of the route setting response frame includes parameters such as Frame Control, Duration, Destination Address, Source Address, Receive Address, and Transmit Address.

<<3. Configuration of Each Communication Apparatus>>

<Configuration of Each Communication Apparatus>

Figure 21:
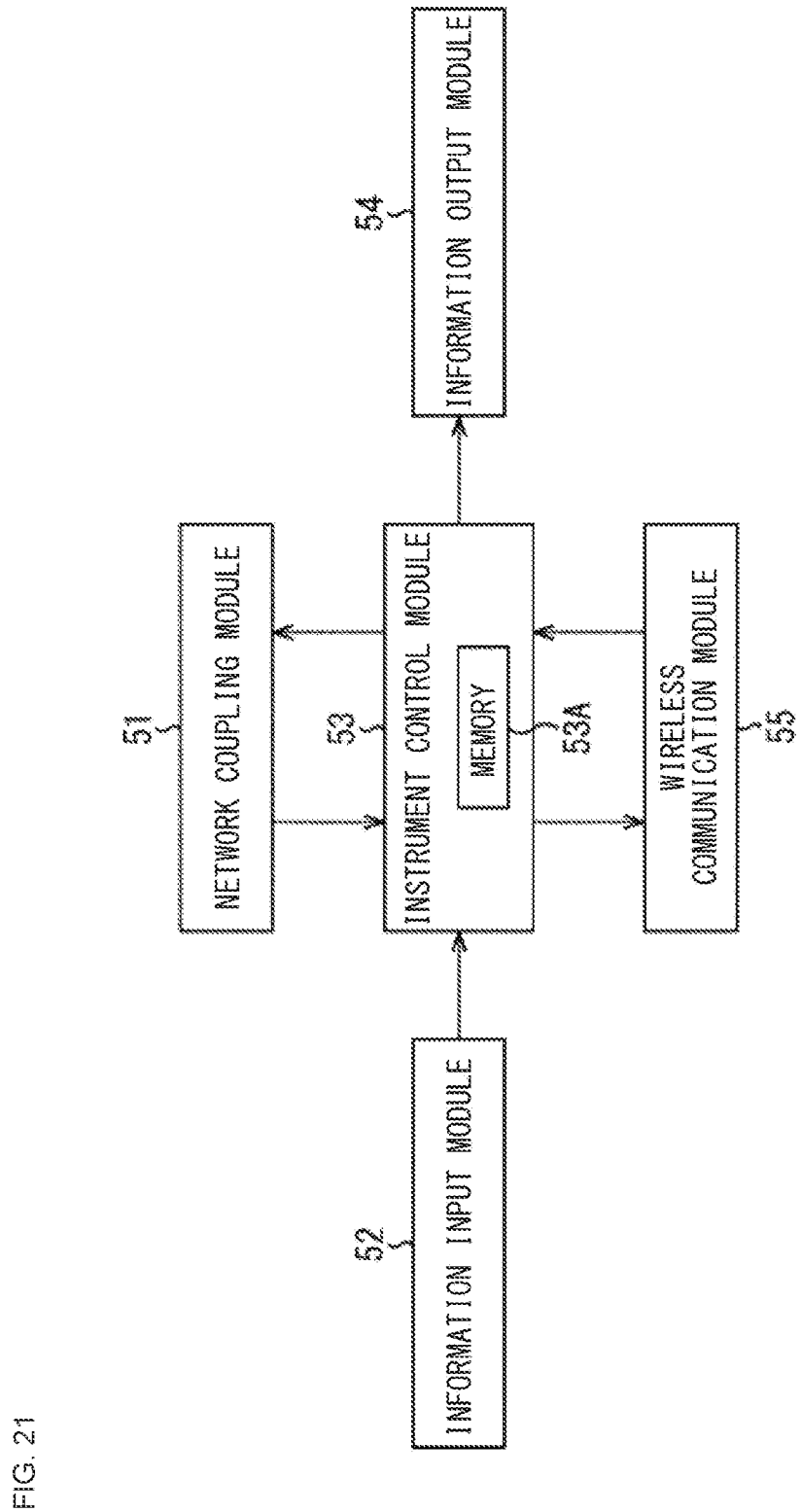
FIG. 21 is a block diagram illustrating a basic configuration example of a communication apparatus.

FIG. 21 is a block diagram illustrating a basic configuration example of each communication apparatus such as the user terminal 11, the data server 12, the wireless communication apparatus 14, or the communication apparatus 15.

The communication apparatus in FIG. 21 includes a network coupling module 51, an information input module 52, an instrument control module 53, an information output module 54, and a wireless communication module 55.

It is to be noted that the user terminal 11, the data server 12, the wireless communication apparatus 14, and the communication apparatus 15 may each be configured by modules necessary for the communication apparatus illustrated in FIG. 21, or may be configured, with an unnecessary portion of the communication apparatus illustrated in FIG. 21 being simplified or not being incorporated.

The network coupling module 51 is configured to implement functions of a communication modem, or the like for coupling to the Internet 13 in a case of operating as the data server 12, the wireless communication apparatus 14, or the communication apparatus 15, under the control of the instrument control module 53. The network coupling module 51 allows coupling to the Internet 13 to be carried out via a public communication line and an Internet service provider.

The Information input module 52 outputs, to the instrument control module 53, information to convey an instruction inputted by the user. The Information input module 52 is configured by a push button, a keyboard, touch panel, and the like.

The instrument control module 53 includes a CPU (Central Processing Unit), a ROM (Read Only Memory), a RAM (Random Access Memory), and the like. The instrument control module 53 executes a program stored in the ROM or the like, causes an application to function at a higher layer, and controls each section of the communication apparatus to operate as each communication apparatus. In addition, the instrument control module 53 includes a memory 53A, and cause the memory 53A to store information necessary for the processing.

The information output module 54 outputs information concerning an operation state of the communication apparatus supplied from the instrument control module 53 or information obtained via the Internet 13. The information output module 54 includes a display device (e.g., the display unit 31 in FIG. 3) such as an LED, a liquid crystal panel or an organic display, a speaker that outputs sound or music, or the like. The information output module 54 displays to the user or notifies the user of necessary information.

The wireless communication module 55 performs wireless communication to thereby transmit data supplied from the instrument control module 53 to another communication apparatus. The wireless communication module 55 performs wireless communication to thereby receive data transmitted from the other communication apparatus and to output the received data to the instrument control module 53.

<Configuration of Wireless Communication Module>

Figure 22:
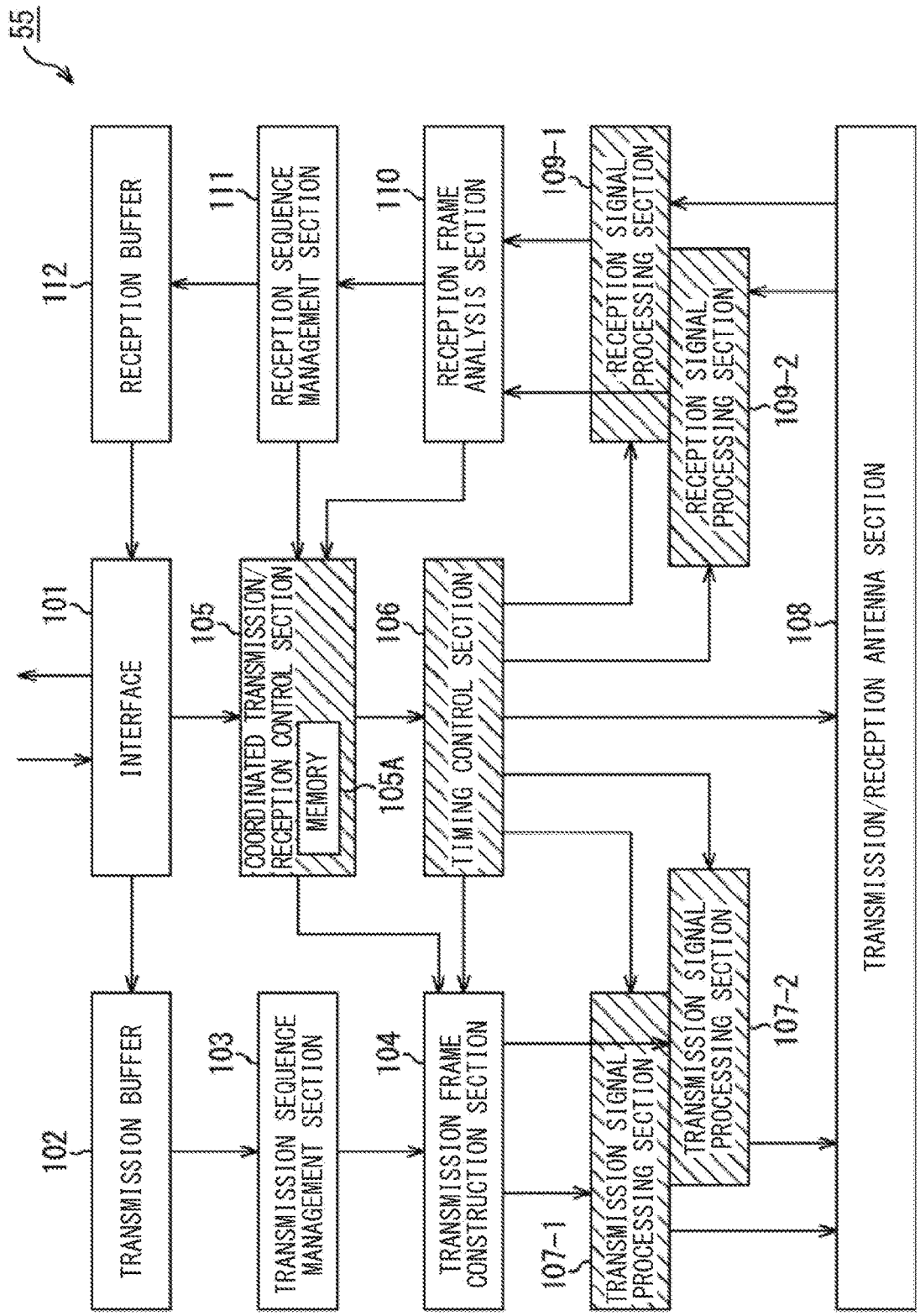
FIG. 22 is a block diagram illustrating a configuration example of a wireless communication module in a case of being a user terminal.

FIG. 22 is a block diagram illustrating a configuration example of the wireless communication module 55 in a case of being the user terminal 11.

The wireless communication module 55 include an interface 101, a transmission buffer 102, a transmission sequence management section 103, a transmission frame construction section 104, a coordinated transmission/reception control section 105, and a timing control section 106. In addition, the wireless communication module 55 includes transmission signal processing sections 107-1 and 107-2, a transmission/reception antenna section 108, reception signal processing sections 109-1 and 109-2, a reception frame analysis section 110, a reception sequence management section 111, and a reception buffer 112.

The interface 101 functions as an interface to exchange, in a predetermined signaling format, information inputted from a user from the instrument control module 53, data supplied from the Internet 13, or information supplied to the user.

The interface 101 outputs data supplied from the instrument control module 53 to the transmission buffer 102. The interface 101 outputs the content data stored in the reception buffer 112 to the instrument control module 53.

In a case of receiving information inputted from the user or data to perform wireless transmission via the interface 101, the transmission buffer 102 temporarily stores the received data.

The transmission sequence management section 103 manages a transmission sequence for the data to be transmitted. In addition, the transmission sequence management section 103 acquires data from the transmission buffer 102, and outputs the acquired data to the transmission frame construction section 104 on the basis of the transmission sequence.

The transmission frame construction section 104 outputs the data supplied from the transmission sequence management section 103 to the transmission signal processing section 107-1 pursuant to a transmission timing supplied from the timing control section 106.

It is to be noted that, in a case of performing the coordinated transmission, or in a case of simultaneously transmitting data to a plurality of reception destinations by utilizing a spatial multiplexing technique, the transmission frame construction section 104 converts, as first data and second data to be transmitted in a coordinated manner, the data supplied from the transmission sequence management section 103 into a predetermined frame format in accordance with an instruction from the coordinated transmission/reception control section 105. The transmission frame construction section 104 outputs a frame of the first data and a frame of the second data to be transmitted in a coordinated manner to the transmission signal processing sections 107-1 and 107-2, respectively, pursuant to the transmission timing supplied from the timing control section 106.

In addition, in accordance with the instruction from the coordinated transmission/reception control section 105, the transmission frame construction section 104 generates a control frame such as the association request, the application request, the coordinated transmission request, the route setting request, and the BlockACK. The transmission frame construction section 104 outputs the generated control frame to the transmission signal processing section 107-1 in accordance with a transmission timing controlled by the timing control section 106.

The coordinated transmission/reception control section 105 controls transmission and reception of the frame on the basis of information inputted from the user supplied via the interface 101 and header information supplied from the reception frame analysis section 110. The coordinated transmission/reception control section 105 controls the transmission frame construction section 104 and the timing control section 106 to thereby control the transmission and reception of the control frame, the execution of the coordinated transmission, and the execution of simultaneous reception of data transmitted in a coordinated manner.

In addition, the coordinated transmission/reception control section 105 includes a memory 105A. The coordinated transmission/reception control section 105 stores information related to the coordinated transmission in the memory 105A and generates information necessary for displaying, on the basis of information inputted from the user supplied via the interface 101 and the header information supplied from the reception frame analysis section 110. The information related to the coordinated transmission and information necessary for displaying are outputted to the instrument control module 53 via the interface 101.

On the basis of the instruction from the coordinated transmission/reception control section 105, the timing control section 106 controls timings of transmissions to the transmission frame construction section 104, the transmission signal processing sections 107-1 and 107-2, and the transmission/reception antenna section 108. On the basis of the header information, or the like supplied from the reception frame analysis section 110, the timing control section 106 controls timings of receptions for the reception signal processing sections 109-1 and 109-2 as well as for the transmission/reception antenna section 108.

In accordance with the transmission timing controlled by the timing control section 106, the transmission signal processing section 107-1 outputs, to the transmission/reception antenna section 108, the control frame and the frame of the first data to be transmitted in a coordinated manner supplied from the transmission frame construction section 104.

In accordance with the transmission timing controlled by the timing control section 106, the transmission signal processing section 107-2 outputs, to the transmission/reception antenna section 108, the frame of the second data to be transmitted in a coordinated manner supplied from the transmission frame construction section 104.

It is to be noted that, in a case of not being the coordinated transmission, the transmission signal processing section 107-1 becomes active. In addition, the transmission signal processing sections 107-1 and 107-2 are hereinafter referred to as a transmission signal processing section 107, in a case where no distinction is necessary.

In accordance with the transmission timing controlled by the timing control section 106, the transmission/reception antenna section 108 transmits, in a coordinated manner, the frame of the first data and the frame of the second data supplied from the transmission signal processing sections 107-1 and 107-2.

In accordance with the reception timing controlled by the timing control section 106, the transmission/reception antenna section 108 receives the frame of the first data and the frame of the second data transmitted in a coordinated manner. The transmission/reception antenna section 108 outputs the frame of the first data and the frame of the second data, which are received, to the reception signal processing sections 109-1 and 109-2, respectively.

In accordance with the transmission timing controlled by the timing control section 106, the transmission/reception antenna section 108 transmits the control frame supplied from the transmission signal processing section 107-1. The transmission/reception antenna section 108 outputs the received control frame to the reception signal processing section 109-1.

In accordance with the reception timing controlled by the timing control section 106, the reception signal processing section 109-1 performs processing of the control frame and the frame of the first data transmitted in a coordinated manner supplied from the transmission/reception antenna section 108. The reception signal processing section 109-1 outputs the control frame and the frame of the first data processed to the reception frame analysis section 110.

On the basis of the reception timing supplied from the timing control section 106, the reception signal processing section 109-2 performs processing of the frame of the second data transmitted in a coordinated manner supplied from the transmission/reception antenna section 108. The reception signal processing section 109-2 outputs the frame of the second data processed to the reception frame analysis section 110.

It is to be noted that, in a case where no coordinated transmission is performed, the reception signal processing section 109-1 becomes active. In addition, the reception signal processing sections 109-1 and 109-2 are hereinafter referred to as a reception signal processing section 109, in a case where no distinction is necessary.

The reception frame analysis section 110 analyzes a frame supplied from the reception signal processing section 109, and extracts necessary header information and data. The reception frame analysis section 110 outputs the extracted header information and the like to the coordinated transmission/reception control section 105. The reception frame analysis section 110 outputs the extracted data to the reception sequence management section 111.

The reception sequence management section 111 manages a reception sequence of data supplied from the reception frame analysis section 110. The reception sequence management section 111 stores the data in the reception buffer 112 on the basis of the reception sequence.

The reception buffer 112 temporarily stores the data. When the data is collected in the reception buffer 112, the collected data is configured as content data, and is outputted to the interface 101.

4. Operation of User Terminal

<Communication Setting Processing of User Terminal>

Figure 23:
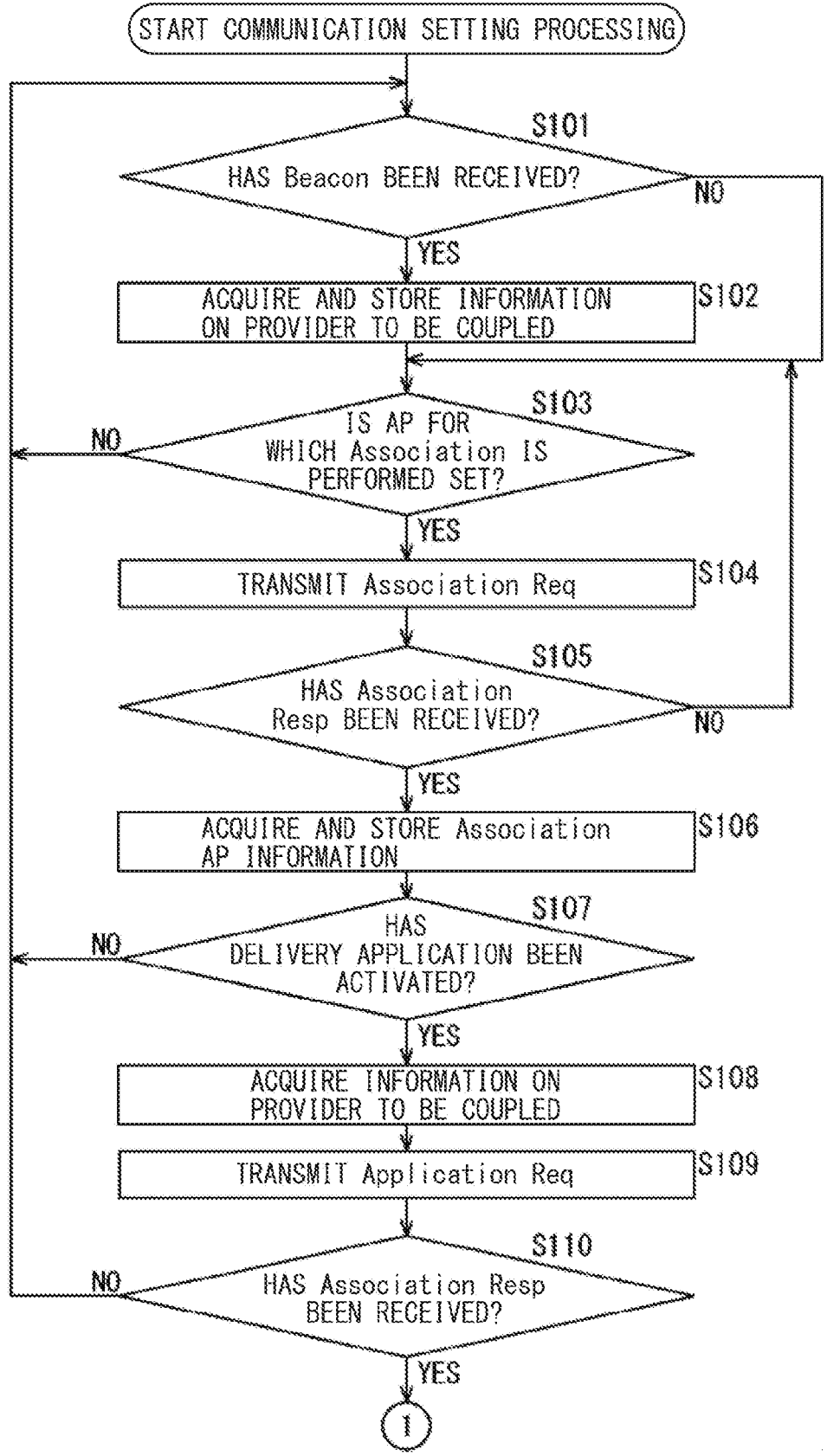
FIG. 23 is a flowchart describing communication setting processing of the user terminal.
Figure 24:
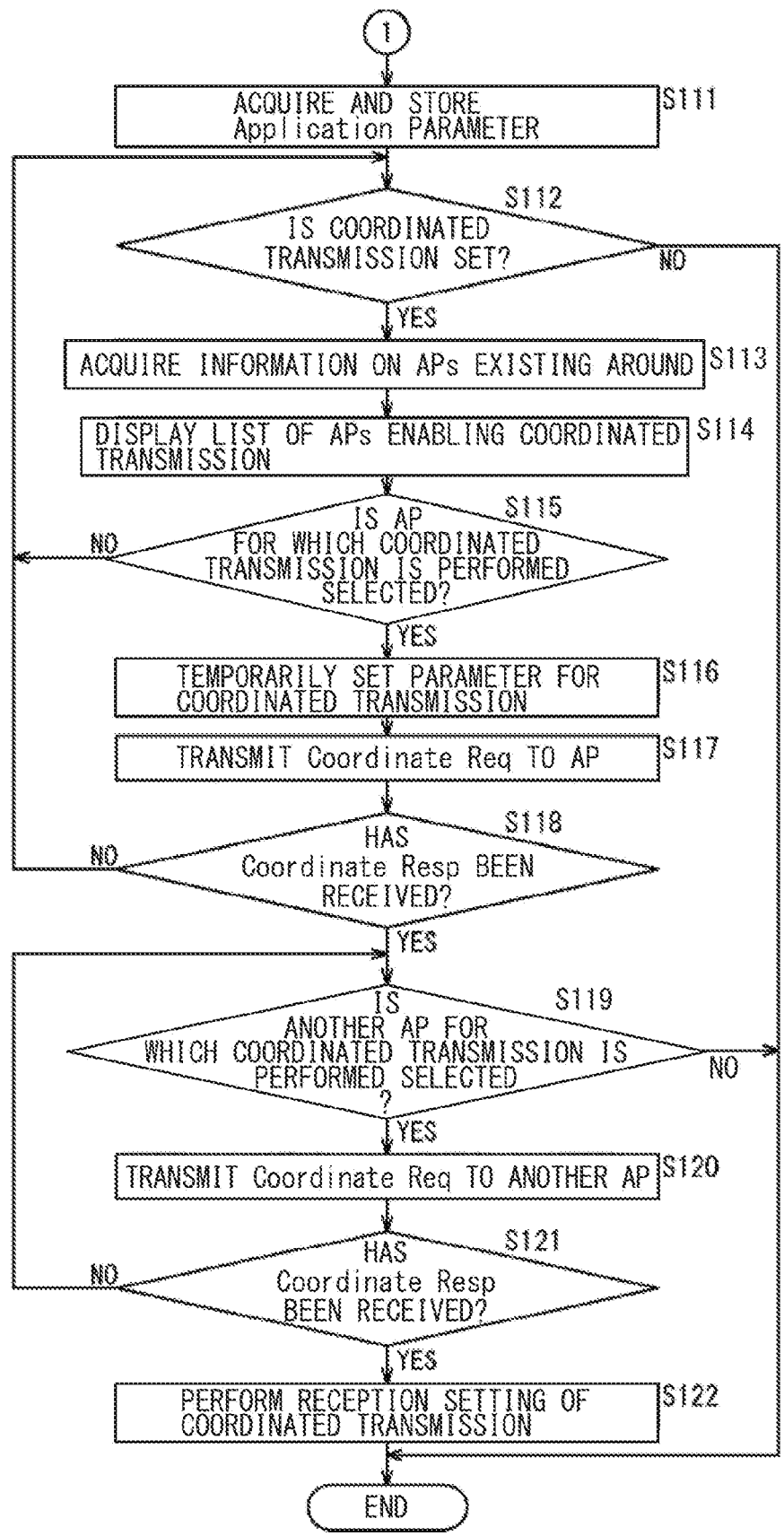
FIG. 24 is a flowchart describing communication setting processing of the user terminal subsequent to FIG. 23.

FIGS. 23 and 24 are each a flowchart describing communication setting processing of the user terminal 11. It is to be noted that this processing is processing which is started after power on, for example.

At time t22, time t42, and time t62 in FIG. 3 described above, the AP1 to the AP3 respectively transmit the Beacon.

After power on, the reception signal processing section 109-1 receives the Beacon, and supplies it to the reception frame analysis section 110 (t1 to t3 in FIG. 3). The reception frame analysis section 110 analyzes a frame supplied from the reception signal processing section 109, and extracts communication parameter information included in the Beacon. The reception frame analysis section 110 outputs the communication parameter information to the coordinated transmission/reception control section 105.

In step S101, the coordinated transmission/reception control section 105 determines whether or not the Beacon has been received. In a case where the coordinated transmission/reception control section 105 determines in step S101 that the Beacon has been received on the basis of the communication parameter information supplied from the reception frame analysis section 110, the processing proceeds to step S102.

The communication parameter information includes Provider information, or the like concerning Provider through which each AP is coupled to the Internet 13.

In step S102, the coordinated transmission/reception control section 105 acquires information on Provider to be coupled, from among the communication parameter information, and stores the acquired Provider information in the memory 105A. The communication parameter information may also be stored.

In a case where a determination is not made in step S101 that the Beacon has been received, the processing of step S102 is skipped, and the processing proceeds to step S103.

In step S103, the coordinated transmission/reception control section 105 determines whether or not an AP for which Association is performed is set, on the basis of a status of APs existing around obtained by the Beacon. In a case where a determination is made in step S103 that the AP for which Association is performed is set (t4 in FIG. 3), the processing proceeds to step S104.

In step S104, the coordinated transmission/reception control section 105 controls the transmission frame construction section 104 to transmit the Association Req to a desired AP (e.g., AP1) (t5 in FIG. 3).

Specifically, the transmission frame construction section 104 generates an Association Req frame, and causes the transmission signal processing section 107-1 to transmit the Association Req frame.

Upon receiving the Association Req, the AP1 transmits the Association Req to the Provider1 (t24 in FIG. 3). In addition, the AP1 receives from the Provider1 the Association Resp to the Association request, and transmits the Association Resp to the user terminal 11 (t26 in FIG. 3).

The reception signal processing section 109-1 receives the Association Resp, and supplies the received Association Resp to the reception frame analysis section 110 (t6 in FIG. 3). The reception frame analysis section 110 analyzes the reception frame supplied from the reception signal processing section 109, and extracts each parameter of the header information and the information element. The reception frame analysis section 110 outputs each parameter of the header information and a necessary information element to the coordinated transmission/reception control section 105.

In step S105, the coordinated transmission/reception control section 105 determines whether or not the Association Resp has been received. In a case where the coordinated transmission/reception control section 105 determines in step S105 that the Association Resp has been received on the basis of each parameter of the header information supplied from the reception frame analysis section 110, the processing proceeds to step S106.

In step S106, the coordinated transmission/reception control section 105 acquires, from each parameter of the header information, Association AP information which is information on an AP for which the Association has been performed, and stores the acquired Association AP information in the memory 105A.

Meanwhile, in a case where a determination is made in step S105 that no Association Resp has been received, the processing returns to step S103 to select another AP for which Association is performed, and the subsequent processing is repeated.

In step S107, the coordinated transmission/reception control section 105 determines whether or not a predetermined delivery application has been activated by a user. In a case where a determination is made in step S107 that the delivery application has been activated, the processing proceeds to step S108. After the activation of the delivery application, for example, information on desired content data is inputted to the user terminal 11 in response to an instruction of the user. That is, the information on the desired content data is supplied to the coordinated transmission/reception control section 105 via the information input module 52, the instrument control module 53, and the interface 101.

In step S108, the coordinated transmission/reception control section 105 reads and acquires the information on Provider to be coupled from the memory 105A.

In step S109, the coordinated transmission/reception control section 105 controls the transmission frame construction section 104 to transmit the Application Req to the Provider1 coupled to the data server 12 in which the desired content data is stored on the basis of the Provider information (t8 in FIG. 3).

Specifically, the transmission frame construction section 104 generates an Application Req frame, and causes the transmission signal processing section 107-1 to transmit the Application Req frame. The Application Req is transmitted to the Provider1 via the AP1 for which the Association has been performed.

Upon receiving the Application Req, the Provider1 transmits the Application Resp to the Application Req (t88 in FIG. 3). The Application Resp is transmitted to the user terminal 11 via the AP1 for which the Association has been performed.

The reception signal processing section 109-1 receives the Application Resp, and supplies the received Application Resp to the reception frame analysis section 110 (t9 in FIG. 3). The reception frame analysis section 110 analyzes a reception frame supplied from the reception signal processing section 109, and extracts each parameter of the header information and the information element. The reception frame analysis section 110 outputs each parameter of the header information and a necessary information element to the coordinated transmission/reception control section 105.

In step S110, the coordinated transmission/reception control section 105 determines whether or not the Application Resp has been received. In a case where the coordinated transmission/reception control section 105 determines in step S110 that the Application Resp has been received on the basis of each parameter of the header information supplied from the reception frame analysis section 110, the processing proceeds to step S111 in FIG. 24.

Meanwhile, in a case where a determination is made in step S110 that no Application Resp has been received, the processing returns to step S101, and the subsequent processing is repeated.

In addition, also in a case where a determination is made in step S103 that an AP for which Association is performed has not been set, or in a case where a determination is made in step S107 that the delivery application has not been activated, the processing returns to step S101, and the subsequent processing is repeated.

In step S111 in FIG. 24, the coordinated transmission/reception control section 105 acquires parameters related to Application, parameters related to a communication route, and the like from among the parameters of the header information and the information element, and stores the parameters in the memory 105A.

In step S112, the coordinated transmission/reception control section 105 determines whether or not to set coordinated transmission. In a case where a determination is made in step S112 that the coordinated transmission is set, the processing proceeds to step S113.

In step S113, the coordinated transmission/reception control section 105 reads and acquires information concerning APs existing around from the memory 105A or the like. The acquired information on APs existing around includes the communication parameter information, the parameters related to the Application, and the parameters related to the communication route. The information concerning APs existing around is outputted to the instrument control module 53 via the interface 101.

In step S114, the instrument control module 53 displays a list of APs enabling coordinated transmission (e.g., AP/route setting screen in FIG. 2) on the information output module 54 on the basis of the information concerning APs existing around. That is, there is displayed a list of APs which enable coordinated transmission and are coupled via a service provider to the data server 12 in response to an instruction of the delivery application to which the data server 12 corresponds.

The user who has viewed the displayed list of APs enabling coordinated transmission selects a desired AP from among the APs enabling coordinated transmission using the information input module 52. The information input module 52 outputs AP selection information to the instrument control module 53 in response to an instruction of the user. The instrument control module 53 outputs the AP selection information to the wireless communication module 55. The AP selection information is supplied to the coordinated transmission/reception control section 105 via the interface 101.

In step S115, the coordinated transmission/reception control section 105 determines whether or not an AP that performs the coordinated transmission is selected. In a case where a determination is made in step S115 that an AP that performs the coordinated transmission is selected, the processing proceeds to step S116.

In step S116, the coordinated transmission/reception control section 105 provisionally sets parameters for the coordinated transmission in a communication terminal on receiving side of data, for setting up the coordinated transmission on the basis of the AP selection information.

In step S117, the coordinated transmission/reception control section 105 controls the transmission frame construction section 104 to transmit the Coordinate Req to the AP2 that performs the coordinated transmission, for example, in the present embodiment (t11 in FIG. 3).

Specifically, the transmission frame construction section 104 generates a Coordinate Req frame, and transmits the Coordinate Req frame to the transmission signal processing section 107-1.

Upon receiving the Coordinate Req, the AP2 transmits Resp (Coordinate Resp) to the Coordinate Req (t46 in FIG. 3).

The reception signal processing section 109-1 receives the Coordinate Resp, and supplies the received Coordinate Resp to the reception frame analysis section 110 (t12 in FIG. 3). The reception frame analysis section 110 analyzes a frame supplied from the reception signal processing section 109, and extracts each parameter of the header information. The reception frame analysis section 110 outputs each parameter of the header information to the coordinated transmission/reception control section 105.

In step S118, the coordinated transmission/reception control section 105 determines whether or not the Coordinate Resp has been received. In a case where a determination is made in step S118 that no Coordinate Resp has been received, the processing returns to step S112, and the subsequent processing is repeated.

In addition, also in a case where a determination is made in step S115 that the AP that performs the coordinated transmission is not selected, the processing returns to step S112, and the subsequent processing is repeated.

Meanwhile, in a case where a determination is made in step S118 that the Coordinate Resp has been received, the processing proceeds to step S119.

In step S119, the coordinated transmission/reception control section 105 determines whether or not another AP that performs the coordinated transmission is selected. In a case where a determination is made in step S119 that the other AP that performs the coordinated transmission is selected, the processing proceeds to step S120.

In step S120, the coordinated transmission/reception control section 105 controls the transmission frame construction section 104 to transmit the Coordinate Req to the other the AP1 to which the coordinated transmission is performed, for example, in the present embodiment, similarly to step S117 (t13 in FIG. 3).

Upon receiving the Coordinate Req, the AP1 transmits the Resp (Coordinate Resp) to the Coordinate Req (t30 in FIG. 3).

In step S121, the coordinated transmission/reception control section 105 determines whether or not the Coordinate Resp has been received similarly to step S118. In a case where a determination is made in step S121 that no Coordinate Resp has been received, the processing returns to step S119 to select another AP as an AP that performs the coordinated transmission, and the subsequent processing is repeated.

In a case where a determination is made in step S121 that the Coordinate Resp has been received, the processing proceeds to step S122. Through those described above, the coordinated transmission is permitted by a plurality of APs.

In step S122, the coordinated transmission/reception control section 105 controls the timing control section 106 to cause the reception signal processing sections 109-1 and 109-2 to perform a reception setting to set reception of data transmitted in a coordinated manner from each AP. Thereafter, the communication setting processing is finished.

Meanwhile, also in a case where a determination is made in steps S112 that no coordinated transmission is set, or in a case where a determination is made in step S119 that no Coordinate Resp has been received, the communication setting processing is finished.

<Coordinated Reception Processing of User Terminal>

Figure 25:
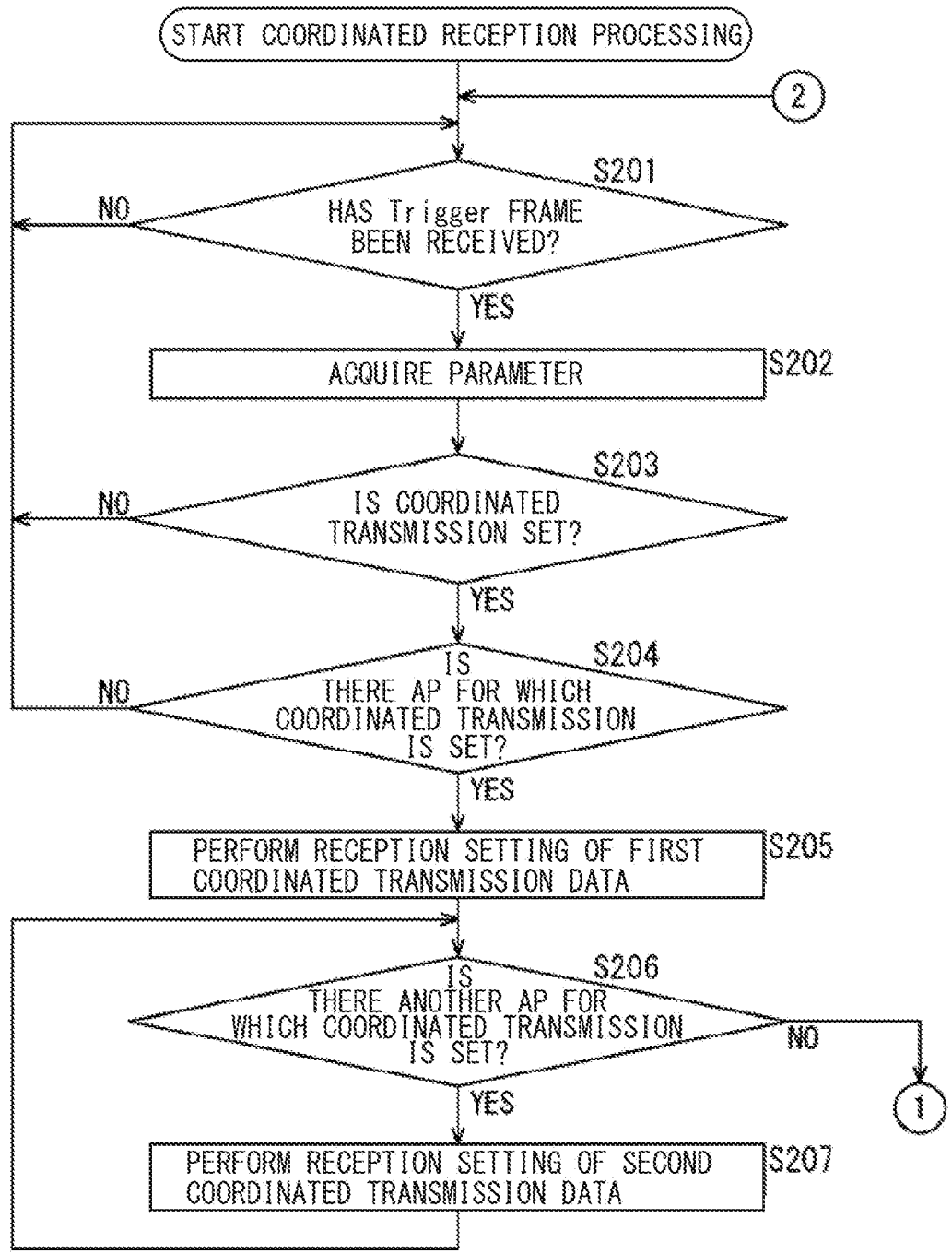
FIG. 25 is a flowchart illustrating coordinated reception processing of the user terminal.
Figure 26:
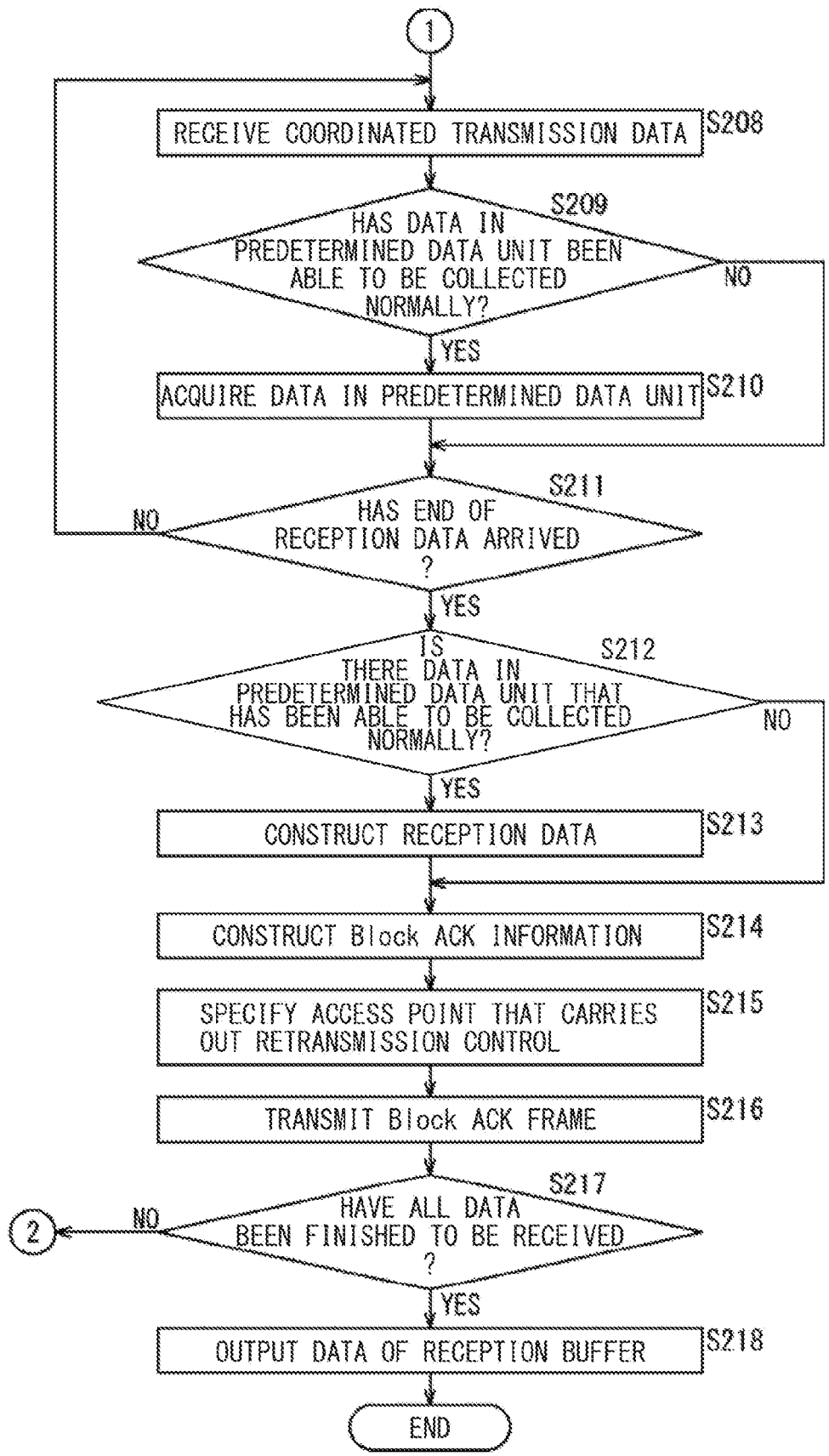
FIG. 26 is a flowchart describing coordinated reception processing of the user terminal subsequent to FIG. 25.

FIGS. 25 and 26 are each a flowchart describing coordinated reception processing of the user terminal 11.

It is to be noted that FIGS. 25 and 26 illustrate processing of receiving data transmitted in a coordinated manner from the plurality of APs set in advance by the communication setting processing in FIGS. 23 and 24.

A trigger frame is transmitted from one (e.g., the AP1) of the APs (t32 in FIG. 3).

The reception signal processing section 109-1 receives the Trigger frame, and supplies the received Trigger frame to the reception frame analysis section 110 (t15 in FIG. 3). The reception frame analysis section 110 analyzes the Trigger frame supplied from the reception signal processing section 109, and extracts parameters of the Trigger frame. The parameters of the Trigger frame include data reception timing, specified information on the coordinated transmission, and information on transmission setting of each AP. The reception frame analysis section 110 outputs the parameters of the Trigger frame to the coordinated transmission/reception control section 105.

In step S201, the coordinated transmission/reception control section 105 waits until receiving the Trigger frame. Then, in a case where a determination is made in step S201 that the coordinated transmission/reception control section 105 has received the Trigger frame on the basis of the parameters of the Trigger frame supplied from the reception frame analysis section 110, the processing proceeds to step S202.

In step S202, the coordinated transmission/reception control section 105 acquires parameters necessary for the coordinated transmission from among the parameters of the Trigger frame.

In step S203, the coordinated transmission/reception control section 105 determines whether or not the coordinated transmission is set on the basis of the acquired parameters, or the like. In a case where a determination is made in step S203 that no coordinated transmission is set, the processing returns to step S201, and the subsequent processing is repeated.

In addition, in step S203, in a case where the coordinated transmission is set by the communication setting processing in FIGS. 23 and 24, a determination is made that the coordinated transmission is set, and the processing proceeds to step S204.

In step S204, the coordinated transmission/reception control section 105 determines whether or not there is any AP for which the coordinated transmission is set. In a case where a determination is made in step S204 that there is no AP for which the coordinated transmission is set, the processing returns to step S201, and the subsequent processing is repeated.

In step S204, in a case where a determination is made that there is an AP for which the coordinated transmission is set, the processing proceeds to step S205.

In step S205, the coordinated transmission/reception control section 105 controls the timing control section 106 to cause the reception signal processing section 109-1 to perform reception setting of first coordinated transmission data.

In step S206, the coordinated transmission/reception control section 105 determines whether or not there is another AP for which the coordinated transmission is set. In a case where a determination is made in step S206 that there is the other AP for which the coordinated transmission is set, the processing proceeds to step S207.

In step S207, the coordinated transmission/reception control section 105 controls the timing control section 106 to cause the reception signal processing section 109-2 to perform reception setting of second coordinated transmission data. Thereafter, the processing returns to step S206, and the subsequent processing is repeated. That is, in a case where a setting of the coordinated transmission is made from more APs, e.g., three or more APs, the user terminal 11 may be configured to allow the reception setting to be made as appropriate.

In a case where a determination is made in step S206 that there is no other AP for which the coordinated transmission is set, the processing proceeds to step S208 in FIG. 26.

The AP1 and the AP2 transmit coordinated transmission data at timings instructed in the Trigger frame (t33 and t49 in FIG. 3).

In step S208 in FIG. 26, the reception signal processing sections 109-1 and 109-2 receive the coordinated transmission data (t16 in FIG. 3).

The reception signal processing sections 109-1 and 109-2 receive the coordinated transmission data, and supply the received coordinated transmission data to the reception frame analysis section 110. The reception frame analysis section 110 analyzes frames of the coordinated transmission data supplied from the reception signal processing section 109, and extracts data in a predetermined data unit (A-MPDU subframe unit in FIG. 15) and parameters of the header information. The reception frame analysis section 110 outputs the data in a predetermined data unit to the reception sequence management section 111, and outputs the parameters to the coordinated transmission/reception control section 105.

In step S209, the reception sequence management section 111 determines whether or not the data in a predetermined data unit, among reception data, has been able to be collected normally. In a case where a determination is made that the data in a predetermined data unit has been able to be collected normally, the processing proceeds to step S210.

In step S210, the reception sequence management section 111 acquires the data in a predetermined data unit that has been able to be collected normally, and stores the data in the reception buffer 112.

In a case where a determination is made in step S209 that the data in a predetermined data unit has not been able to be collected normally, step S210 is skipped, and the processing proceeds to step S211.

In step S211, the reception sequence management section 111 determines whether or not the end of reception data (A-MPDU frame in FIG. 15) has arrived. In a case where a determination is made that the end of the reception data has not arrived, the processing returns to step S208, and the subsequent processing is repeated.

In a case where a determination is made in step S211 that the end of the reception data has arrived, the processing proceeds to step S212. In the present embodiment, for example, the first coordinated transmission data is received by the reception signal processing section 109-1, and simultaneously the second coordinated transmission data is received by the reception signal processing section 109-2, which pieces of data are each configured to be processed.

In step S212, the reception sequence management section 111 determines whether or not there is any data in a predetermined data unit that has been able to be collected normally. In a case where a determination is made in step S212 that there is data in a predetermined data unit that has been able to be collected normally, the processing proceeds to step S213.

In step S213, the reception sequence management section 111 collects the data in a predetermined data unit from results of the reception of the first coordinated transmission data and the second coordinated transmission data from the reception buffer 112 or the like, and constructs the reception data (A-MPDU frame) to store the reception data in the reception buffer 112.

In a case where a determination is made in step S212 that there is no data in a predetermined data unit that has been able to be collected normally, step S213 is skipped, and the processing proceeds to step S214.

In step S214, the coordinated transmission/reception control section 105 constructs Block ACK information which is an acknowledgment in the reception sequence management section 111.

In step S215, the coordinated transmission/reception control section 105 identifies an AP that carries out a retransmission control.

In step S216, the coordinated transmission/reception control section 105 controls the transmission frame construction section 104 to cause the AP that carries out a retransmission control to transmit the Block ACK frame (FIG. 16) (t17 in FIG. 3).

In step S217, the coordinated transmission/reception control section 105 determines whether or not all the pieces of data have been finished to be received. In a case where a determination is made in step S217 that not all the pieces of data have been finished to be received, the processing returns to step S201, and the subsequent processing is repeated. That is, the coordinated transmission/reception control section 105 waits again for data to be transmitted in a coordinated manner.

In a case where a determination is made in step S217 that all the pieces of data have been finished to be received, the processing proceeds to step S218. It is to be noted that, also in a case where the retransmission is not performed due to time-out, or the like before receiving all the pieces of data, the processing proceeds to step S218.

In step S218, the reception sequence management section 111 causes the instrument control module 53 (application) to output the data stored in the reception buffer 112 via the interface 101.

5. Others

Effects

As described above, according to the present technology, it is possible to start setting up by setting an AP that performs the coordinated transmission from the user terminal, thus making it possible to execute the coordinated transmission by an arbitrary AP.

That is, it is possible to reuse an existing AP without introducing a new AP in a case where the coordinated transmission is executed.

In addition, as long as the AP is equipped with a coordinated transmission function, it is possible to execute the coordinated transmission even when utilizing an AP of a different manufacturer.

It is possible to specify an AP at an arbitrary timing, thus making it possible to set up the coordinated transmission by setting an optimal AP as needed, for example, in a case of executing an application required by a user.

It is possible for the user to select an optimum AP by displaying existing APs enabling the coordinated transmission among APs existing around.

That is, it is possible for the user to easily display existence of APs therearound corresponding to the coordinated transmission, because of the user terminal provided with a display function of a display, or the like.

In addition, it is possible for the user to easily specify an arbitrary AP that performs the coordinated transmission, because of the user terminal provided with an interface by which an instruction of the user is inputted.

The existence of the data server corresponding to the application and the collection of information on the service provider that accesses the Internet make it possible for the user to select an optimum AP for the user.

Configuration Example of Computer

The series of processing described above may be executed by hardware or may be executed by software. In a case of executing the series of processing by software, a program included in the software is installed in a computer incorporated into dedicated hardware or in a general-purpose personal computer, etc., from a program recording medium.

Figure 27:
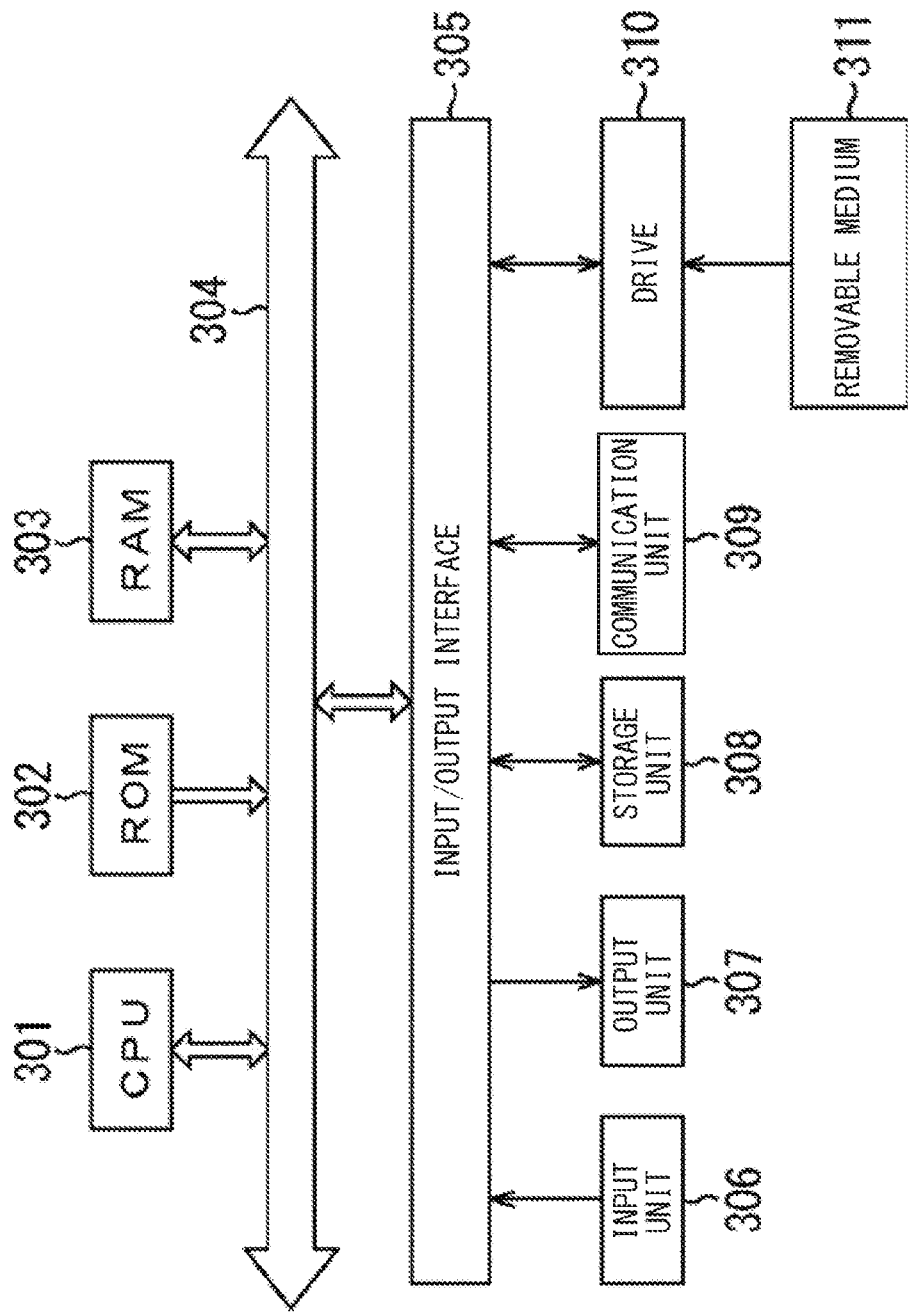
FIG. 27 is a block diagram illustrating a configuration example of a computer.

FIG. 27 is a block diagram illustrating a configuration example of hardware of a computer that executes the series of processing described above by a program.

A CPU (Central Processing Unit) 301, a ROM (Read Only Memory) 302, and a RAM (Random Access Memory) 303 are coupled together by a bus 304.

An input/output interface 305 is further coupled to the bus 304. An input unit 306 including a keyboard, a mouse, and the like, and an output unit 307 including a display, a speaker, and the like are coupled to the input/output interface 305. In addition, a storage unit 308 including a hard disk and a non-volatile memory, a communication unit 309 including a network interface, and a drive 310 that drives a removable medium 311 are coupled to the input/output interface 305.

In the computer configured as described above, for example, the CPU 301 loads a program stored in the storage unit 308 into the RAM 303 via the input/output interface 305 and the bus 304 and executes the program to thereby perform the series of processing described above.

For example, the program to be executed by the CPU 301 is recorded in the removable medium 311, or provided via a wired or wireless transmission medium such as a local area network, the Internet, or digital broadcasting, and installed in the storage unit 308.

It is to be noted that the program to be executed by the computer may be a program in which processing is performed in time series in the order described in the present specification, or may be a program in which pieces of processing are performed in parallel or at a necessary timing such as the time when a call is made.

It is to be noted that, in the present specification, the term "system" means a set of a plurality of components (devices, modules (parts), etc.), regardless of whether or not all the components exist in the same casing. Accordingly, a plurality of devices housed in separate casings and coupled via a network, and one device in which a plurality of modules is housed in one casing are each a system.

In addition, the effects described herein are merely illustrative and are not limitative, and may have other effects.

The embodiment of the present technology is not limited to the above-described embodiment, and may be modified in a wide variety of ways without departing from the gist of the present technology.

For example, the present technology may have a configuration of cloud computing in which one function is shared and processed jointly by a plurality of apparatuses via a network.

In addition, each step described in the above-described flowcharts may be shared and executed by a plurality of devices, in addition to being executed by one apparatus.

Further, in a case where a plurality of pieces of processing are included in one step, the plurality of pieces of processing included in the one step may be shared and executed by a plurality of devices, in addition to being executed by one apparatus.

Example of Combination of Configurations

The present technology may also have the following configurations.

(1)

A wireless communication terminal including a communication control section that starts setting up coordinated transmission in order to cause a plurality of wireless communication apparatuses to execute the coordinated transmission.

(2)

1 The wireless communication terminal according to (1), in which the communication control section transmits a setup request for the coordinated transmission to a desired one of the wireless communication apparatuses, and receives a response to the setup request from the wireless communication apparatus.

(3)

2 The wireless communication terminal according to (2), in which the communication control section performs, in a case of receiving the response to the setup request from each of a plurality of the wireless communication apparatuses to which the setup request has been transmitted, a reception setting of the coordinated transmission to be executed in the plurality of the wireless communication apparatuses.

(4)

3 The wireless communication terminal according to (2) or (3), in which the communication control section exercises a control to return an acknowledgment for the coordinated transmission toward the wireless communication apparatus that carries out a retransmission control over the coordinated transmission.

(5)

4 The wireless communication terminal according to any one of (2) to (4), further including a display control unit that controls displaying of information corresponding to the wireless communication apparatus that is able to execute the coordinated transmission.

(6)

5 The wireless communication terminal according to (5), further including an operation input unit by which an instruction of a user is inputted, in which the communication control section selects a desired one of the wireless communication apparatuses in response to the instruction of the user.

(7)

6 The wireless communication terminal according to (6), in which the display control unit controls displaying of the information corresponding to the wireless communication apparatus and information corresponding to a service provider to be coupled to a network, and the communication control section selects the desired one of the wireless communication apparatuses and the service provider in response to the instruction of the user.

(8)

7 The wireless communication terminal according to (7), in which the display control unit controls displaying of information on each of routes with respect to the wireless communication apparatus and the service provider.

(9)

8 The wireless communication terminal according to (7), in which the display control unit controls displaying of a communication status calculated for each of routes with respect to the wireless communication apparatus and the service provider.

(10)

9 The wireless communication terminal according to (2), in which the communication control section selects the wireless communication apparatus and a service provider to be coupled to a network.

(11)

10 The wireless communication terminal according to (2), in which the communication control section exercises a control to receive content data in a predetermined application from a server coupled to a network via the wireless communication apparatus.

(12)

11 The wireless communication terminal according to (1), in which the communication control section transmits a setup request for the coordinated transmission to each of the plurality of wireless communication apparatuses, and performs, in a case of receiving a response to the setup request from each of the plurality of wireless communication apparatuses, a reception setting of the coordinated transmission to be executed in the plurality of wireless communication apparatuses.

(13) 12

The wireless communication terminal according to (1), in which a setup request to cause the plurality of wireless communication apparatuses to execute the coordinated transmission includes address information on a related communication apparatus.

(14)

13 The wireless communication terminal according to (13), in which a response to the setup request includes a network control information element necessary to select the wireless communication apparatus that causes the plurality of wireless communication apparatuses to execute the coordinated transmission.

(15)

14 The wireless communication terminal according to (1), in which the communication control section transmits a setup request for the coordinated transmission to a desired one of the wireless communication apparatuses coupled to a data server via a service provider in response to an instruction from an application to which the data server corresponds.

(16)

15 The wireless communication terminal according to (15), in which the communication control section transmits, in a case where desired ones of the wireless communication apparatuses communicate via the different service providers, the setup request to each of the desired ones of the wireless communication apparatuses.

(17) 16

A wireless communication method including causing a wireless communication terminal to start setting up coordinated transmission in order to cause a plurality of wireless communication apparatuses to execute the coordinated transmission.

REFERENCE NUMERALS LIST 11 user terminal
12 data server
13 Internet
14, 14-1 to 14-3 communication apparatus
15, 15-1, 15-2 communication apparatus
51 network coupling module
52 information input module
53 instrument control module
53A memory
54 information output module
55 wireless communication module
101 interface
102 transmission buffer
103 transmission sequence management section
104 transmission frame construction section
105 coordinated transmission/reception control section
105A memory
106 timing control section
107, 107-1, 107-2 transmission signal processing section
108 transmission/reception antenna section
109, 109-1, 109-2 reception signal processing section
110 reception frame analysis section
111 reception sequence management section
112 reception buffer

The invention claimed is:

1. A wireless communication terminal, comprising:
at least a processor and a memory, comprising:
a communication control section configured to set up coordinated transmission to cause a plurality of wireless communication apparatuses to execute the coordinated transmission,
wherein a setup request to cause the plurality of wireless communication apparatuses to execute the coordinated transmission includes address information on a specific communication apparatus, and
a response to the setup request, includes a network control information element necessary to select a wireless communication apparatus of the plurality of wireless communication apparatuses, that causes the plurality of wireless communication apparatuses to execute the coordinated transmission.

2. The wireless communication terminal according to claim 1, wherein the communication control section is further configured to:
   transmit the setup request for the coordinated transmission to the plurality of wireless communication apparatuses; and
   receive the response to the setup request from the plurality of wireless communication apparatuses.

3. The wireless communication terminal according to claim 2, wherein the communication control section is further configured to perform, based on the response to the setup request from each of the plurality of wireless communication apparatuses to which the setup request is transmitted, a reception setting of the coordinated transmission executable in the plurality of the wireless communication apparatuses.

4. The wireless communication terminal according to claim 3, wherein the communication control section is further configured to return an acknowledgment for the coordinated transmission toward the wireless communication apparatus that carries out a retransmission control over the coordinated transmission.

5. The wireless communication terminal according to claim 2, further comprising a display control unit configured to control a display of first information corresponding to the wireless communication apparatus that is able to execute the coordinated transmission.

6. The wireless communication terminal according to claim 5, further comprising an operation input unit configured to receive an input of a user instruction,
   wherein the communication control section is further configured to select the wireless communication apparatus in response to the user instruction.

7. The wireless communication terminal according to claim 6, wherein the display control unit is further configured to control the display of the first information corresponding to the wireless communication apparatus and a display of second information corresponding to a service provider to be coupled to a network, and
   the communication control section is further configured to select the wireless communication apparatus and the service provider in response to the user instruction.

8. The wireless communication terminal according to claim 7, wherein the display control unit is further configured to control a display of third information on each of routes with respect to the wireless communication apparatus and the service provider.

9. The wireless communication terminal according to claim 7, wherein the display control unit is further configured to control a display of a communication status calculated for each of routes with respect to the wireless communication apparatus and the service provider.

10. The wireless communication terminal according to claim 2, wherein the communication control section is further configured to select the wireless communication apparatus and a service provider to be coupled to a network.

11. The wireless communication terminal according to claim 2, wherein the communication control section is further configured to receive content data in a specific application from a server coupled to a network via the wireless communication apparatus.

12. The wireless communication terminal according to claim 1, wherein the communication control section is further configured to:
   transmit the setup request for the coordinated transmission to each of the plurality of wireless communication apparatuses; and
   perform, based on the response to the setup request from each of the plurality of wireless communication apparatuses, a reception setting of the coordinated transmission executable in the plurality of wireless communication apparatuses.

13. The wireless communication terminal according to claim 1, wherein the communication control section is further configured to transmit the setup request for the coordinated transmission to the wireless communication apparatus,
   the wireless communication apparatus is coupled to a data server via a service provider, and
   the transmission of the setup request is in response to an instruction from an application to which the data server corresponds.

14. The wireless communication terminal according to claim 13, wherein the communication control section is further configured to transmit, based on the plurality of wireless communication apparatuses communicate via a plurality of service providers, the setup request to the plurality of wireless communication apparatuses.

15. A wireless communication method, comprising:
   setting up, by a wireless communication terminal, coordinated transmission to cause a plurality of wireless communication apparatuses to execute the coordinated transmission,
   wherein a setup request to cause the plurality of wireless communication apparatuses to execute the coordinated transmission includes address information on a specific communication apparatus, and
   a response to the setup request, includes a network control information element necessary to select a wireless communication apparatus of the plurality of wireless communication apparatuses, that causes the plurality of wireless communication apparatuses to execute the coordinated transmission.

* * * * *